Dec. 12, 1944. W. D. YOUNG 2,364,839
METHOD OF MAKING BANDAGES AND THE LIKE
Filed Nov. 30, 1942 10 Sheets-Sheet 1
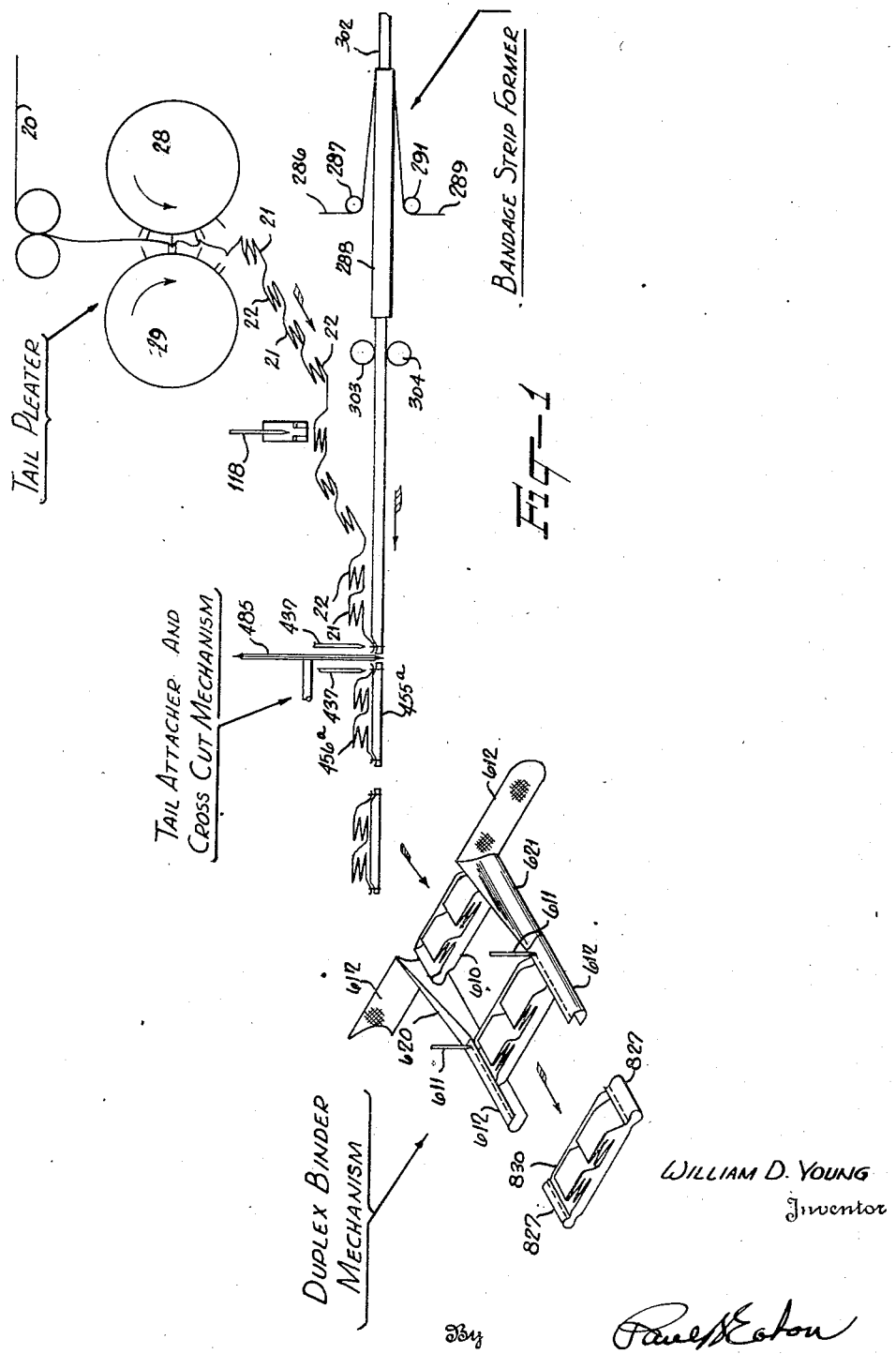

Dec. 12, 1944.  W. D. YOUNG  2,364,839
METHOD OF MAKING BANDAGES AND THE LIKE
Filed Nov. 30, 1942  10 Sheets-Sheet 2
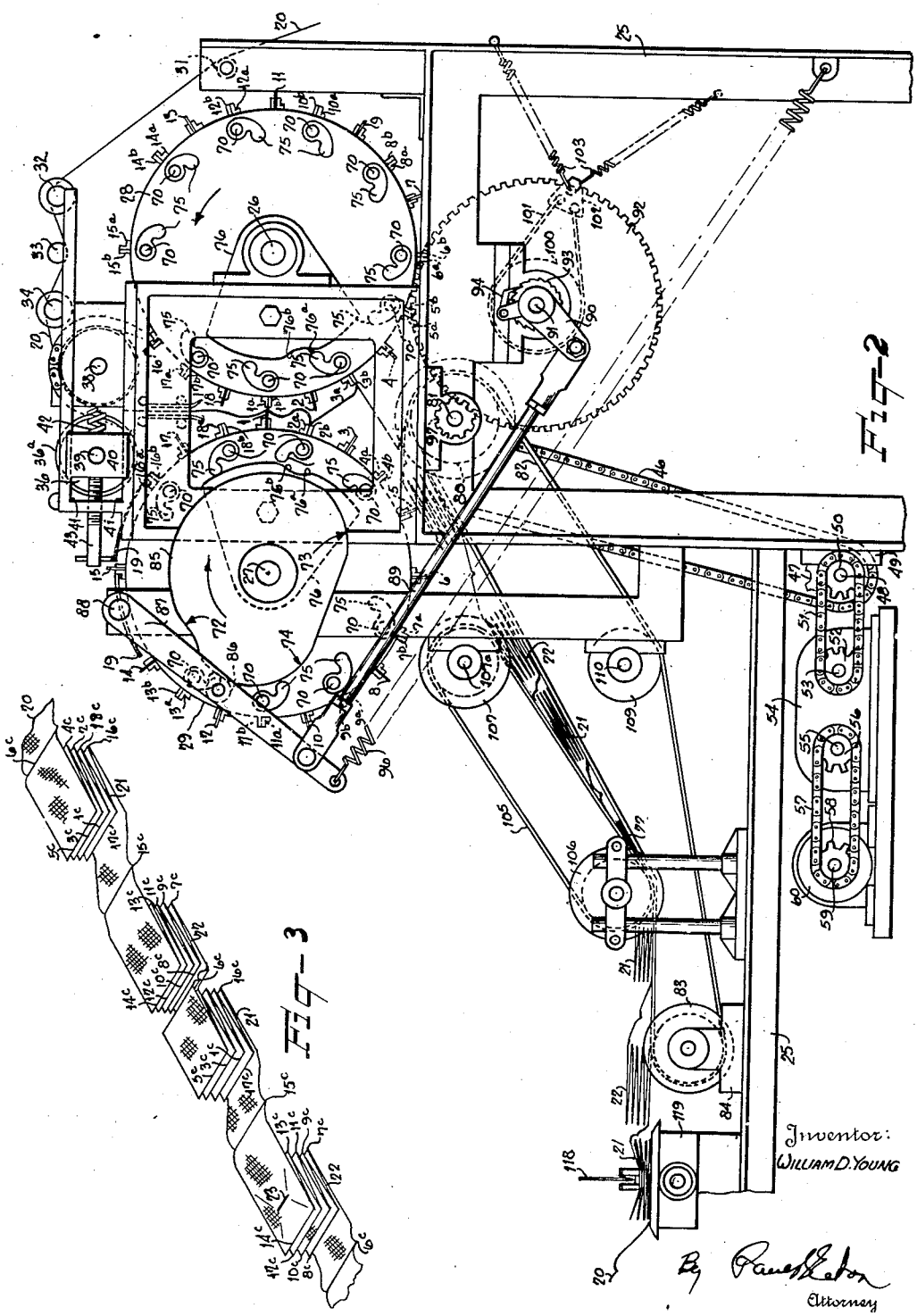

Dec. 12, 1944.   W. D. YOUNG   2,364,839
METHOD OF MAKING BANDAGES AND THE LIKE
Filed Nov. 30, 1942   10 Sheets-Sheet 3
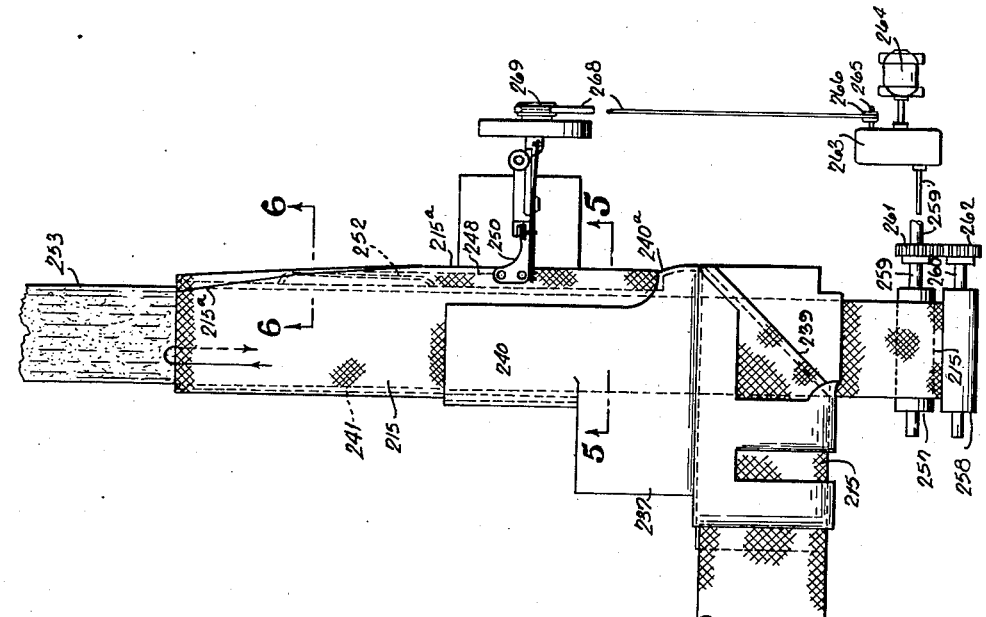
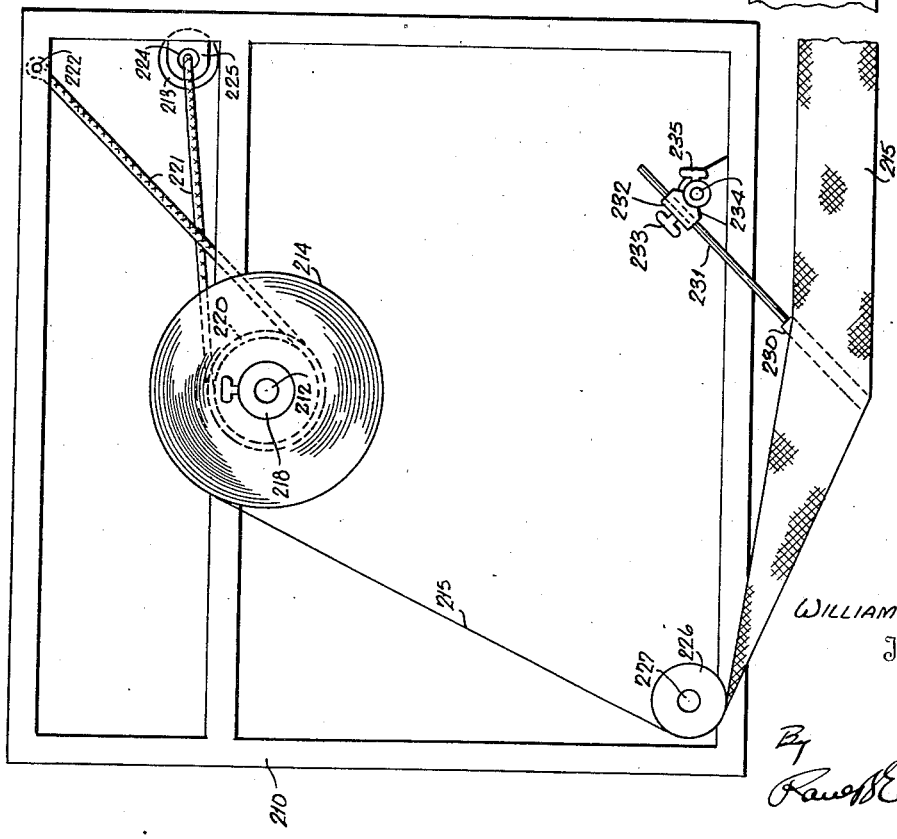
WILLIAM D. YOUNG
Inventor
By
Raue B. Eaton
Attorney

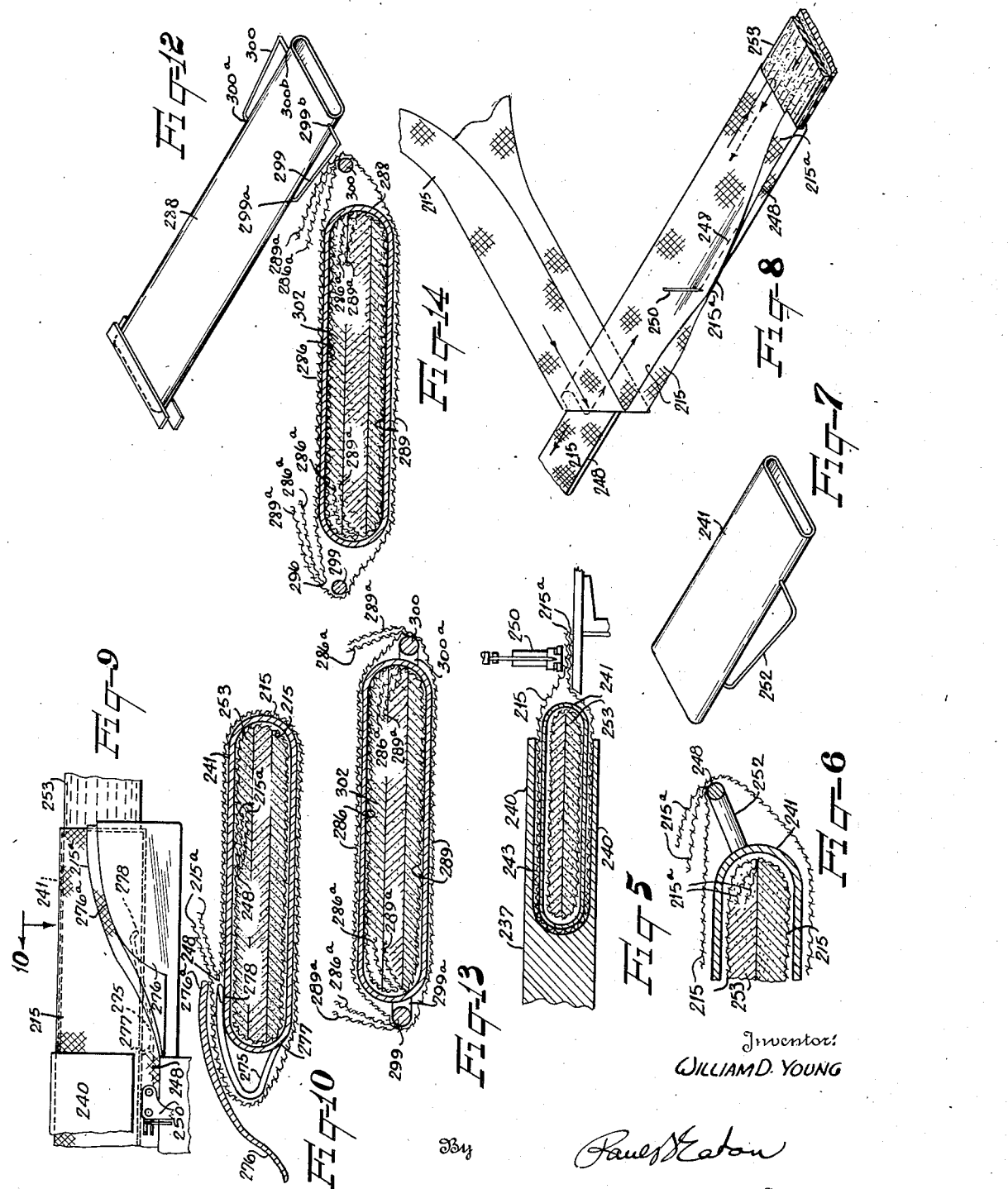

Dec. 12, 1944.  W. D. YOUNG  2,364,839
METHOD OF MAKING BANDAGES AND THE LIKE
Filed Nov. 30, 1942     10 Sheets-Sheet 5
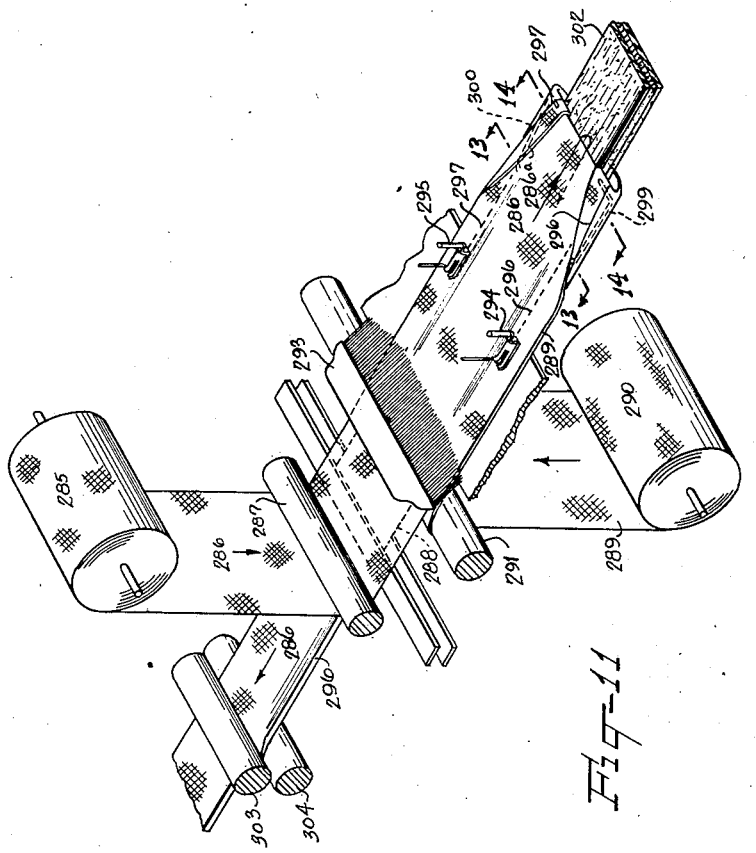

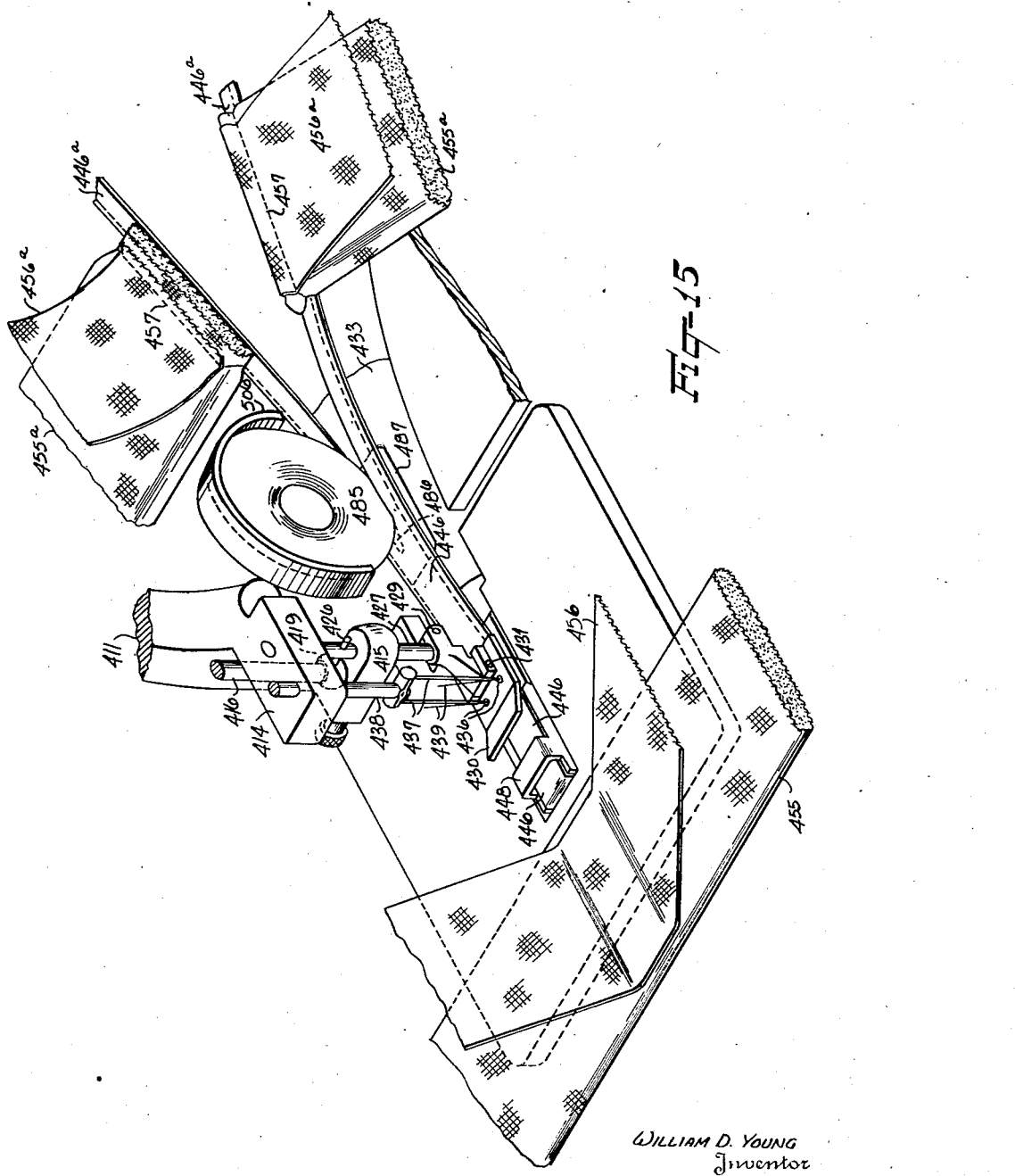

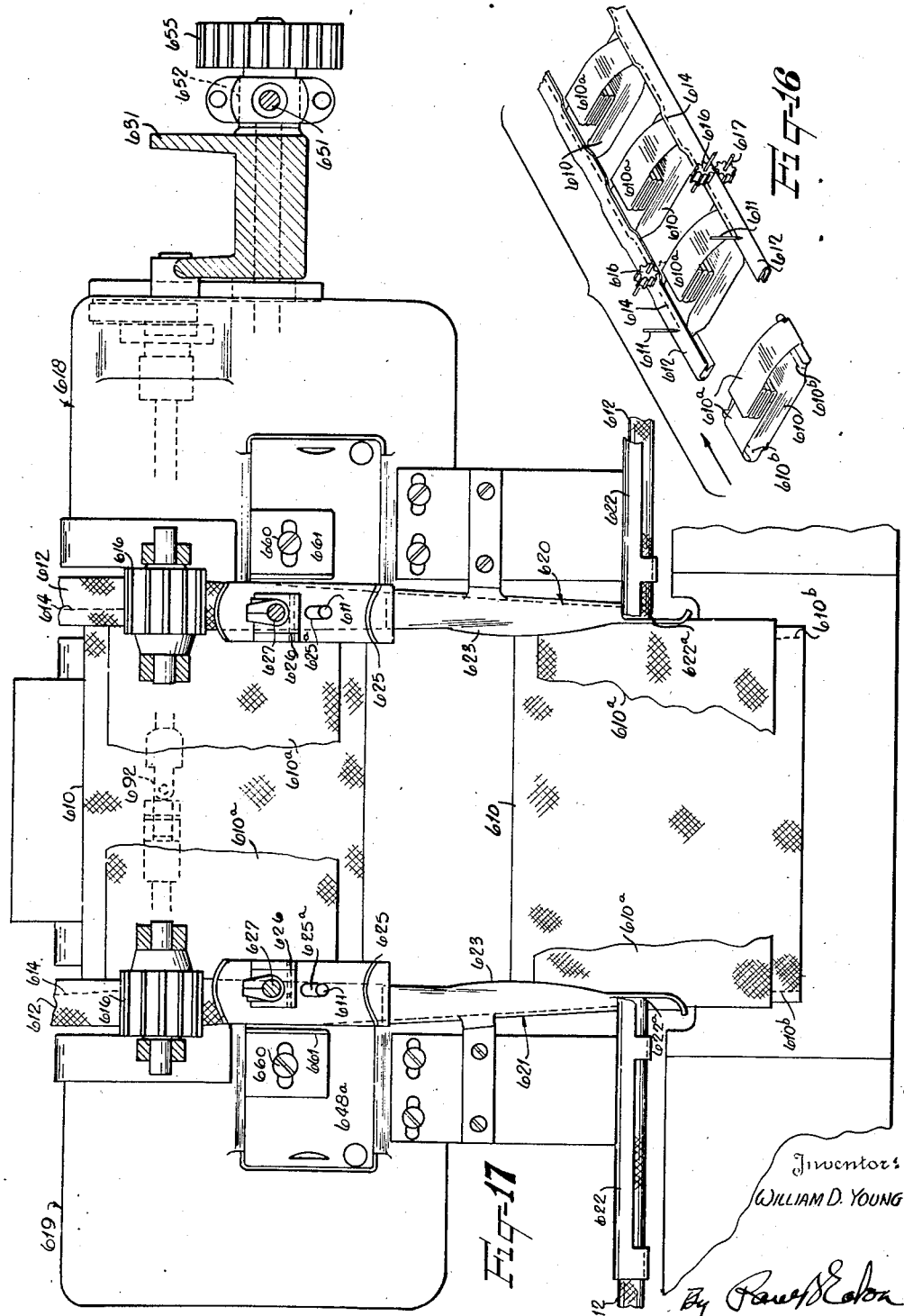

Dec. 12, 1944.    W. D. YOUNG    2,364,839
METHOD OF MAKING BANDAGES AND THE LIKE
Filed Nov. 30, 1942    10 Sheets-Sheet 8
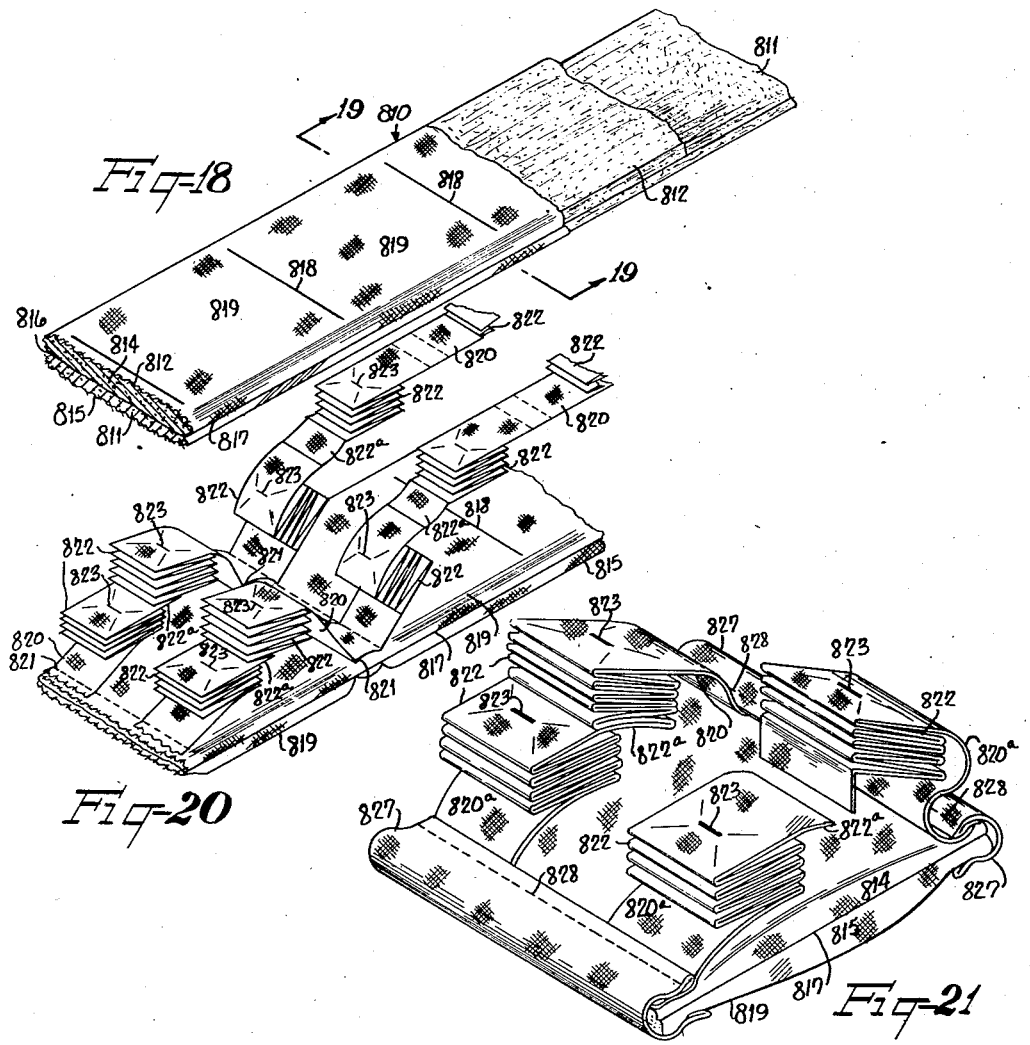
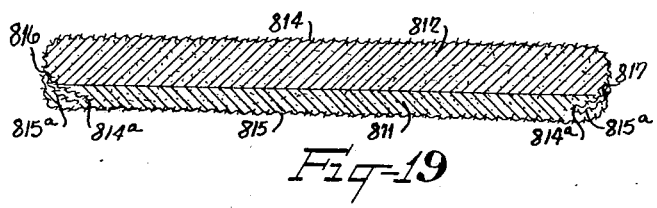
WILLIAM D. YOUNG
Inventor
By Paul S. Eaton
Attorney Dec. 12, 1944.    W. D. YOUNG    2,364,839
METHOD OF MAKING BANDAGES AND THE LIKE
Filed Nov. 30, 1942    10 Sheets-Sheet 9
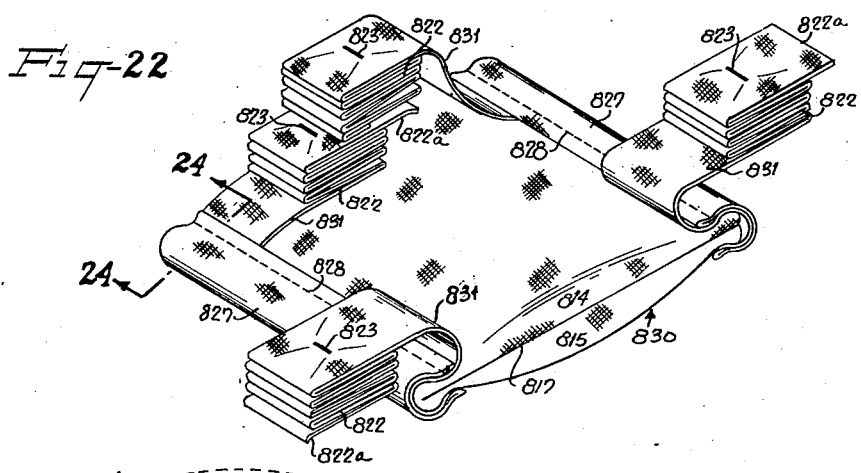
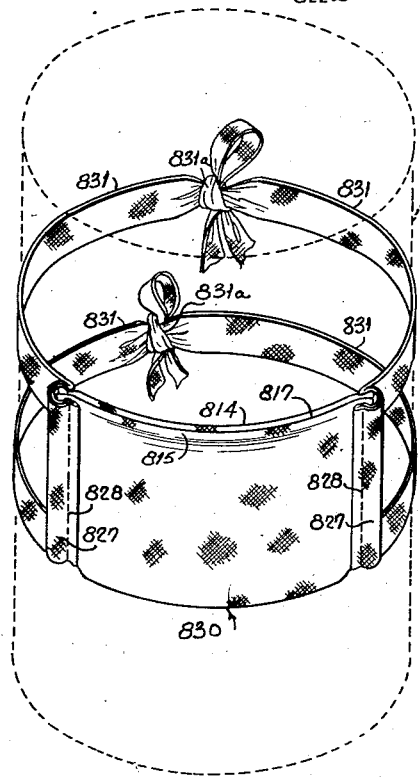
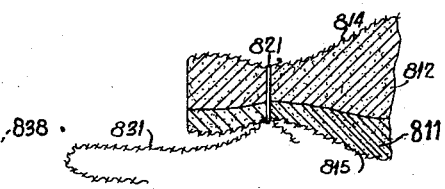
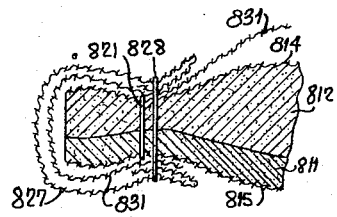
WILLIAM D. YOUNG
Inventor
By
Attorney Dec. 12, 1944.    W. D. YOUNG    2,364,839
METHOD OF MAKING BANDAGES AND THE LIKE
Filed Nov. 30, 1942    10 Sheets-Sheet 10
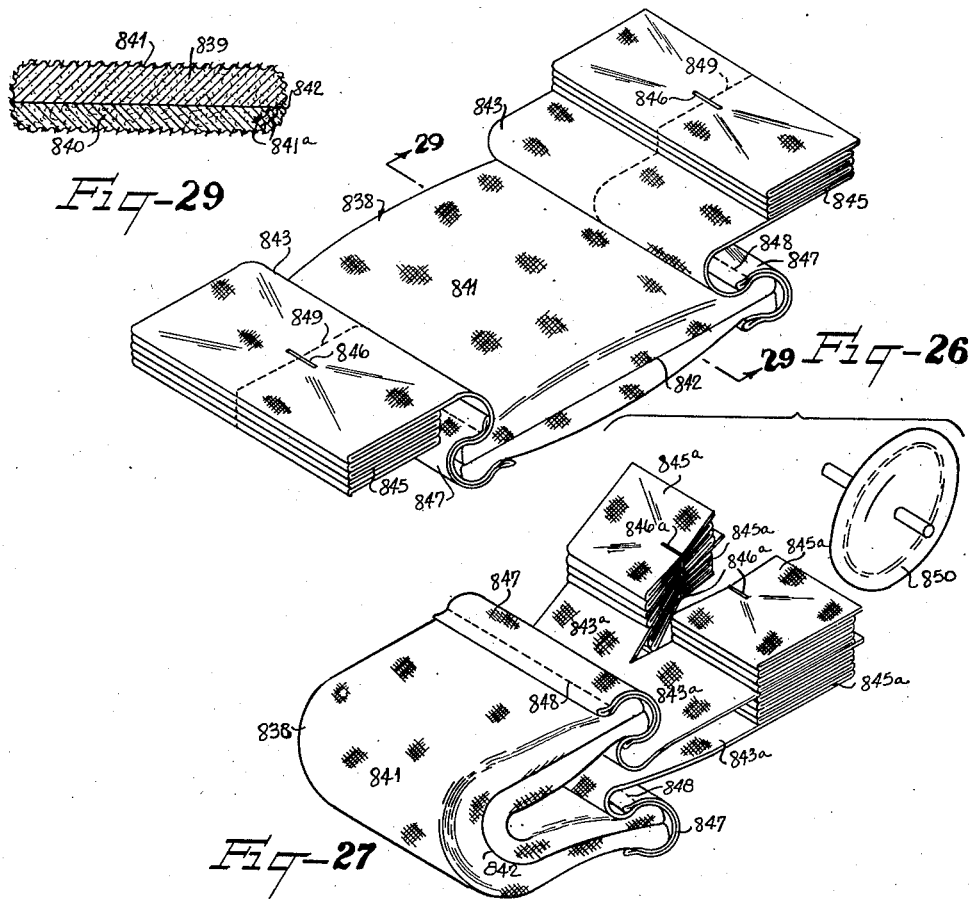
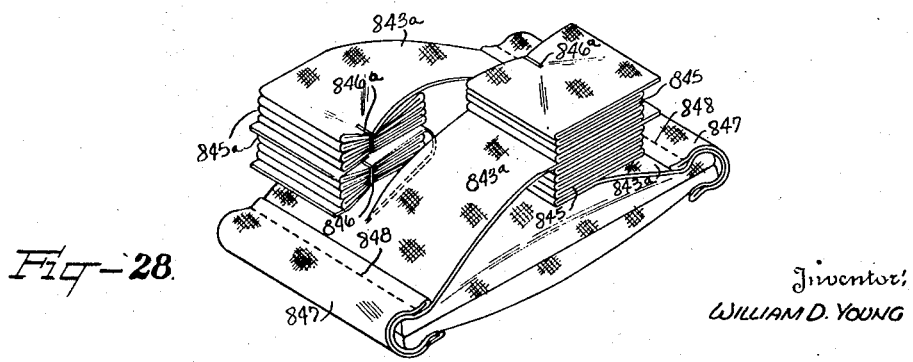
Inventor:
WILLIAM D. YOUNG
By Paul S. Eaton
Attorney Patented Dec. 12, 1944

2,364,839

UNITED STATES PATENT OFFICE 2,364,839

METHOD OF MAKING BANDAGES AND THE LIKE

William D. Young, Greenville, S. C., assignor of ten per cent to Thomas B. Taylor, ten per cent to Maravene S. Taylor, both of Port Washington, N. Y., fifteen per cent to Dorothy R. Young, Greenville, S. C., twenty per cent to Arthur C. Kingston, Belmont, Mass., ten per cent to Betty Jane Young, ten per cent to Jean Ann Young, ten per cent to Nancy Lou Young, all of Greenville, S. C., and one per cent to Eugene Richter, Montclair, N. J.

Application November 30, 1942, Serial No. 467,355

15 Claims. (Cl. 112—2)

This invention relates to the manufacture of bandages, sanitary napkins, and the like and more especially to an improved method of producing surgical bandages such as disclosed in copending patent application Serial No. 460,252, filed September 30, 1942, now Patent No. 2,337,011 of December 14, 1943.

Heretofore much difficulty has been encountered in obtaining the desired output in the manufacture of the above-mentioned bandages on account of the antiquated methods employed which require numerous manual operations upon each individual bandage.

It is an object of this invention to provide a novel method of bandage manufacture which will reduce the individual manual operations upon each bandage to a minimum and thus streamline the production and increase the output.

It is another object of this invention to continuously produce bandages of the class described by employing a production line in which the various operations are successively performed in the proper order upon the bandage, thus increasing the efficiency of the method as a whole.

It is another object of this invention to provide an improved method of the class described comprising continuously forming a bandage strip, continuously pleating a bandage tail, successively attaching said pleated tail to said strip and simultaneously severing the tail and strip into a shorter length, and simultaneously binding the opposed severed edges of said shorter length. The apparatus showing one way of carrying out the above-named method are shown in separate patent applications filed of even date herewith.

Some of the objects of the invention having been stated, other objects will appear as the description proceeds, when taken in connection with the accompanying drawings, in which:

Figure 1 is a schematic view illustrating the order of the various machines employed in this improved method of manufacturing bandages;

Figure 2 is an elevation of the apparatus employed for making the material shown in Figure 3;

Figure 3 is an isometric view of a strip of web material folded upon itself in such a manner as to provide a series of interconnected batches of material.

Figure 4 is a plan view of one form of apparatus for making a bandage strip or pad.

Figure 5 is a sectional view taken along the line 5—5 in Figure 4 illustrating the third formation of the bandage or pad cover sheet;

Figure 6 is an enlarged sectional detail view taken along the line 6—6 in Figure 4, further illustrating the projecting edges of the tubular cover when in a completely folded position against one of the faces of the tubular cover;

Figure 7 is an isometric view of one end of the forming tube, illustrating the guiding mechanism for turning the projecting edges which are beyond the cover seam into substantially parallel relationship to one of the faces of the tubular cover;

Figure 8 is a schematic isometric view illustrating the various folds of the cover material prior to the same encasing a lap of filler material, but omitting the forming apparatus.

Figure 9 is a plan view, similar to the upper righthand portion of Figure 4, illustrating a slightly modified form of the invention in which the tubular cover and longitudinal seam are rotated around the exterior of the forming tube prior to said cover being turned inside-out and reversely directed to the interior of the tube and over the filler material;

Figure 10 is a sectional view taken at the point 10 in Figure 9;

Figure 11 is an isometric view illustrating another modified form of the invention in which at least two sheets of material are used for forming the cover sheet and in which two seams are employed at opposed edges of the sheets to form a tubular cover;

Figure 12 is an isometric view of the forming tube over which the tubular cover is formed, and through which the filler material and reversed cover are passed when forming the bandage;

Figure 13 is a transverse sectional view taken along the line 13—13 in Figure 11 illustrating the mechanism for turning the projecting edges of the tubular cover, which are disposed beyond the seam, into parallel relation to one of the faces of the bandage material;

Figure 14 is a transverse sectional view taken along the line 14—14 in Figure 11, said view being similar to Figure 13 except the projecting edges beyond the seam are turned to completely parallel positions to one face of the bandage cover;

Figure 15 is an isometric view of the crosscut machine, illustrating the material upon which the machine operates;

Figure 16 is a schematic isometric view illustrating a series of bandages in the process of having hems simultaneously sewed on each end thereof;

Figure 17 is a sectional plan view showing a portion of a duplex hemming machine together with bandages and associated hem strips;

Figure 18 is an isometric view of the body portion for improved surgical bandages, the length of said portion shown being sufficient to form a plurality of bandages therefrom;

Figure 19 is a transverse sectional view taken along the line 19—19 in Figure 18;

Figure 20 is an isometric view similar to Figure 18, but showing tie tapes being applied to the body portion;

Figure 21 is an isometric view of a bandage after the tie tapes have been attached and after the ends of the bandages have been bound;

Figure 22 is an isometric view showing a slightly modified form of bandage;

Figure 23 is an enlarged sectional view showing the first step in forming the bandage illustrated in Figure 22.

Figure 24 is an enlarged sectional view taken along the line 24—24 in Figure 22 showing the binding and tie tape construction of the completed bandage;

Figure 25 is an isometric view showing the bandage applied to a limb of a patient's body;

Figure 26 is an isometric view of another slightly modified form of bandage, said bandage being partially completed;

Figure 27 is an isometric view showing the next step in the construction of the bandage shown in Figure 26, in which the pleated overlapped tie tapes are slit longitudinally to thereby provide additional tie tapes;

Figure 28 is an isometric view showing the method of folding the tie tapes after having been slitted;

Figure 29 is a transverse sectional view taken along the line 29—29 in Figure 26.

In carrying out the present method in the manufacture of surgical bandages, five distinct operations are effected. Of course, there are other minor operations which are necessary in order to place the bandage in a finished form; however, it is thought that the five above-named operations essentially comprise the novel features of the invention. These essential operations may be carried out by five separate steps, namely the pleating the tails, forming the bandage strip, attaching the tails to the bandages, and cutting the bandage strip into individual bandages, and binding both ends of the bandages. Figure 1 shows five steps of the manufacturing method arranged in their proper order for manufacture of surgical bandages. The specific structure of five mechanisms for carrying out the method is shown in detail in the accompanying drawings. The tail pleater is shown in detail in Figures 2 and 3 and is covered in a separate patent application, Serial Number 467,350 filed of even date herewith entitled Method and means for forming bandage tails, now Patent No. 2,336,051 of December 7, 1943. The former apparatus is shown in detail in Figures 4 to 14 inclusive, and is covered in a separate patent application Serial No. 467,351 and filed of even date herewith entitled Method and apparatus for forming bandage strips, now Patent No. 2,352,354 of June 27, 1944. The tail attacher and cross-out mechanism is shown in Figure 15 and is fully shown and described in a separate patent application, Serial No. 467,352 and filed of even date herewith, entitled Method and means for attaching tie tapes to bandage strips, now Patent No. 2,352,355 of June 27, 1944. The duplex binding mechanism is shown in detail in Figures 16 and 17 and is covered in a separate patent application, Serial No. 467,352 and filed of even date herewith entitled Duplex binding machine and method.

The bandage produced by the method is shown in Figures 18 to 29 inclusive and forms the subject matter of patent application Serial No. 460,252, filed September 30, 1942, entitled Bandages and method of making same, now Patent No. 2,337,011 of December 14, 1943.

When these mechanisms are properly coordinated, a new and distinct result is obtained, which is better than that obtained from the individual operations of the separate mechanism, and thus the manufacture of surgical bandages is very much simplified and expedited. The present method contemplates the manufacture and packaging of surgical bandages of the class described completely by a continuous process thereby insuring an increased production as well as a uniformity in the workmanship of the finished product.

*Bandage tail pleater*

Referring more particularly to Figures 1, 2 and 3 of the drawings, the numeral 20 denotes a piece of web material which is folded back and forth from opposed faces thereof along transverse crease lines 1c to 18c inclusive to form interconnected batches of folded web material 21 and 22. The material disposed between adjacent crease lines 15c (Figure 3) is sufficient to provide two tie tapes for a bandage, such as disclosed in the above-mentioned Patent Number 2,337,011. Usually the folded material 20, as shown in Figure 3, is severed along lines 15c as the unfolded portions of the folded material are attached to the opposed edges of a bandage pad, after which the attached material is again severed intermediate its ends along crease line 6c so as to form two tie tapes, each tape having its end folded upon itself in the form of a batch 21 or 22. The folds of the batches 21 and 22 immediately after being formed, are releasably secured to each other by any suitable means, such as a tack stitch 23; however, other means may be employed for accomplishing this purpose.

In the present invention, the folded tape 20 is produced in a continuous length in order to expedite production, and this continuous length is subdivided when the same is attached to the bandages in a manner previously described. In forming the folded tape 20, the web material is successively and alternately creased along lines 18c to 1c inclusive, after which the creased material is permitted to settle into batches 21 and 22. After a batch is completed, it is removed to permit the succeeding batch to be formed. In other words, there is a mechanism employed which successively creases a continuously moving strip of web material while a supporting means for the creased material intermittently removes piles or batches of the creased material from a stationary position disposed below the creasing mechanism, thereby forming interconnected batches. It is, therefore, evident that the means which convey the accumulated batches of folded material away from stationary position must be operated in timed relation to the creasing apparatus, so that the interconnecting unfolded link between the batches will be of the proper length.

It can be seen by observing the right-hand portion of Figure 3, for example, that the unfolded connecting link between crease lines 16c and 14c of batches 21 and 22 respectively is considerably longer than the connecting link between crease lines 7c and 5c of the next succeeding batches 22 and 21 respectively, therefore, the amount of intermittent movement of the conveying means, after the accumulation of the first-named batch 21 and before the second batch 22 is begun, must be somewhat greater than the amount of the intermittent movement between the time that the second batch 22 begins moving away from fixed position until the third batch 21 is begun.

In the accompanying drawings, the numeral 25 designates the framework of the mechanism which processes the strip of material 20 shown in Figure 3. This framework has rotatably mounted therein shafts 26 and 27, which, in turn, have pairs of spaced discs 28 and 29 respectively mounted thereon. The pair of discs 28 have secured to their periphery radially disposed blades 2, 4, 7, 9, 11, 13, 16, and 18, which blades respectively penetrate between socket members 2a, 2b, and 4a, 4b, and 7a, 7b, and 9a, 9b, and 11a, 11b, and 13a, 13b, and 16a, 16b, and 18a, 18b as the two pairs of discs rotate about their respective shafts 26 and 27. In other words, the blades mesh with the sockets when the blades and sockets move into coinciding relation.

The unfolded strip of web material 20 is adapted to pass downwardly between the respective blades and sockets and to be transversely creased thereby when each blade enters a socket.

The above described blades on discs 28 and sockets on discs 29 serve to crease the strip of material only from one face thereof to produce transverse crease lines 2c, 4c, 7c, 9c, 11c, 13c, 16c, and 18c. A substantially similar structure is employed for producing the creases 1c, 3c, 5c, 6c, 8c, 10c, 12c, 14c, 15c, and 17c from the opposed face of the strip of material 20. This structure comprises blades 1, 3, 5, 6, 8, 10, 12, 14, 15, and 17, which are mounted upon the periphery of discs 29, said blades respectively fitting into sockets 1a, 1b, and 3a, 3b, and 5a, 5b, and 6a, 6b, and 8a, 8b, and 10a, 10b, and 12a, 12b, and 14a, 14b, and 15a, 15b and 17a, 17b, as the discs rotate. The position of the blades and the sockets, of course, determines the positions of transverse crease lines 1c to 18c in the piece of web material 20. Blades 1, 3, 4, 5, 8, 10, 12, 14, and 17 and socket members 2a, 2b, 4a, 4b, 7a, 7b, 9a, 9b, 11a, 11b, 13a, 13b, 16a, 16b, 18a, and 18b are secured upon the peripheries of spaced discs 29 to form one cylinder, whereas blades 2, 4, 7, 9, 11, 13, 16, and 18 and socket members 1a, 1b, 3a, 3b, 5a, 5b, 6a, 6b, 8a, 8b, 10a, 10b, 12a, 12b, 14a, 14b, 15a, 15b, 17a, and 17b are secured upon the peripheries of spaced discs 28 to form another cylinder.

As the tape of web material 20 is introduced to the creasing apparatus described, it passes upwardly from a suitable source of supply, not shown, such as a roll, and is adapted to ride upon a guide rod 31 in the framework 25. From this rod 31, the tape passes over another guide rod 32, then below a guide rod 33 and again above another guide rod 34, after which the tape passes downwardly between feed rollers 35 and 36, which advance the uncreased tape of material downwardly between guide fingers 37 and then between the discs 28 and 29 where the above described transverse creases are placed in the opposed faces thereof. It is necessary for the rollers 35 and 36 to rotate at a sufficient peripheral speed to produce a forward slack in the advanced material so that there will be a sufficient length of material to permit the transverse creases to be placed therein when the blades penetrate the socket members.

The feed roller 35 is fixedly secured upon a shaft 38, said shaft, in turn, being rotatably mounted in the upper portion of framework 25. The adjoining feed roller 36 is fixedly mounted upon a shaft 39, and the ends of this shaft are rotatably mounted in a pair of blocks 40, which blocks are mounted upon trackways 41 for sliding movement towards and away from feed roller 35.

Disposed between each of the blocks 40 and the framework 25 is a compression spring 42, said spring being adapted to normally force the two feed rollers 35 and 36 apart from each other. The action of spring 42 is overcome to a large extent, however, by means of adjustment screws 43, which are threadably mounted in framework 25 to engage the opposite sides of blocks 40 from the sides engaged by the compression spring 42. These screws 43 serve to regulate the amount of pressure exerted by the feed rollers 35 and 36 upon the tape 20 as it passes therebetween.

The driving means for the feed rollers 35 and 36 is shown in Figure 2, and more fully shown in my Patent No. 2,336,051. The end of shaft 38 has fixedly secured thereon a sprocket wheel, not shown, which has a chain 46 mounted thereon, and said chain being also mounted upon a second sprocket 47 on a shaft 48. Shaft 48 is mounted in bearings 49, secured to the framework 25.

Also mounted on the shaft 48 (see Figure 2) is a sprocket 50 upon which a chain 51 is mounted, said chain being also mounted on a sprocket 52 on a shaft 53 extending from a gear reduction unit 54. Gear reduction unit 54 has another shaft 55 extending therefrom, which, in turn, has a sprocket 56 mounted thereon. This sprocket 56 has a chain 57 mounted thereon, and chain 57 is also mounted on a sprocket 58 on a motor shaft 59 of motor 60.

The previously described parts indicated by reference characters 51 to 60 inclusive merely illustrate a conventional drive employing a gear reduction principle. It is to be understood, however, that any suitable driving mechanism may be employed as long as the proper speed is imparted to the feed rollers 35 and 36.

The driving means for the discs 28 and 29, together with their associated blade and socket members is illustrated in Patent No. 2,336,051.

This driving mechanism drives the proximate edges of the discs 28 and 29 downwardly, and is driven by a chain 46 driven by shaft 48 as is fully shown in Patent No. 2,336,051. It is, of course, understood that the relative rate of travel of the blade and socket members to that of the feed rollers is such as to properly crease the tape of web material 20 as it is fed downwardly from the feed rollers.

Referring again to Figure 2, it is seen that each of socket members 1—b to 18b inclusive has its inner end secured to a transversely disposed shaft 70. These shafts are arranged in a circle about the shafts 26 and 27 and between the two pairs of the spaced discs 28 and 29. A spring shown in Patent No. 2,336,051 is employed for each socket member for rotating the free end of each socket member 1—b and 18b against companion stationary socket member 1a to 18b inclusive.

Each of the rotatably mounted shafts 70 in discs 28 and 29 has fixedly secured on one end thereof a lever 75, said lever having its free end positioned in such a manner that it will engage a fixed cam 76 during a part of the revolution of the discs 28 and 29 about the axes of rotation 26 and 27 respectively.

For example, the blade 1 on spaced discs 29 is disposed on one side of the tape 20 and the associated socket members 1a and 1—b are disposed on the other side. When the material 20 is pressed between members 1a and 1b by blade 1, the free end of socket member 1—b must yield so as to provide the necessary space. When the blade is in an inserted position, the free end of the lever 75 on the shaft 70 is engaging its associated fixed cam 76 sufficiently to slightly separate socket member 1—b from socket member 1a, but at the same time, the blade 1 and the folded material is being gripped. As the discs 28 continue to rotate in a counter-clockwise manner, and the discs 29 simultaneously rotate in a clockwise manner, the blade 1 will automatically be removed from between the socket members 1a and 1b, thereby permitting the folded material to be further gripped between these socket members to crease the same. The depression 76b in fixed cam 76 permits this further gripping and creasing when the blade is removed. After rotating still farther in the above-named direction, the free end of the lever 75 will engage a high side 76a on fixed cam 76 to thereby rotate the free end of socket member 1b away from the fixed socket member 1a and release the creased material. It is therefore seen that immediately after the creased portions of the tape 20 are released at the point 76a on cam 76, the creased material is permitted to fold in a zig-zag manner to form a fan folded or accordion folded batch. It is to be noted that each set of bandage tails comprises two accordion folded batches, and that these batches have the crease line 6c disposed further from the crease lines 5c and 7c than the other crease lines of the batch, such as for example, the distance between the crease lines 16c and 17c and that the crease lines 15c along which the material is severed to form a set of folds for a bandage are considerably further from the crease lines 14c and 16c than the fold lines of the batches as for example, the distance between 8c and 9c. By referring to the drawings, it is seen how this is accomplished. By observing the left-hand central portion of Figure 2, it is to be noted that the distance between the members 5 and 6 and the members 6 and 7a is greater than the distance between the members 2a and 2b for example. At the points 5, 6, and 7a, the crease lines 5c, 6c, and 7c are formed. Now by observing the upper left-hand corner of Figure 2, it is seen that the distance between members 14, 15, and 16a is very much greater than the distance between the members 14 and 13b, or the distance between members 13a and 12. At the points 14, 15, and 16a, the crease lines 14c, 15c, and 16c are formed, thus providing a much greater distance between the crease lines, so that the strip may be severed at the crease lines 15c to form a set of two accordion folds to provide the tails for a bandage, the ends of the set of folds appearing at 15c are the ends which are secured to the ends of the bandage. It is also quite evident that the companion turret or wheel 28 has its creasing members spaced to agree with the creasing members on wheel 29 just described. The members 15 and 16 have secured thereto one end of arcuate members 19 which fit against the periphery of disk 28 between members 14a, 15a, and 16 to hold the tape in proper position for creasing.

It is necessary for a suitable supporting means to be provided for the creased material as it is released by the blade and socket members. With this in view, a roller 80 has been provided, which roller is fixedly mounted on a shaft 81, rotatably mounted in framework 25. A belt 82 is mounted on roller 80, said belt also being mounted on another roller 83 rotatably mounted in bearings 84. It is seen by observing Figure 2 that the upper end of the belt 82, when disposed on the roller 80, is positioned immediately beneath the point where the material 20 is creased, and consequently, this upper portion of the belt will act as a supporting means for the folded creased material. As the zig-zag creased material accumulates in a plurality of superposed accordion folds upon the belt 82, it is necessary to intermittently advance the belt so that interconnected spaced piles or batches will be provided.

In order to intermittently advance the belt in timed relation to the operation of the creasing apparatus, and also in order to provide long and short interconnected links between the batches 21 and 22 of the creased material, a suitable cam 85 has been fixedly secured on the shaft 27. The periphery of this cam is adapted to be engaged by a roller 86 on the intermediate portion of a lever 87, said lever having its upper end secured on a pivot shaft 88 on framework 25. The lower end of the lever 87 has pivotally secured thereto one end of a link 89. Link 89 has its other end pivotally secured to the lower end of a lever 90, which lever has its upper end mounted for oscillation around shaft 91. The shaft 91 has fixedly mounted thereon a gear 92, shaft 91 having fixed thereon a ratchet 93 which is adapted to be engaged by a pawl 94 on the previously described lever 90. It is seen by observing Figure 2 that the roller 86 is normally held in engagement with the periphery of cam 85 by means of a tension spring 96.

During the operation of the machine and while the shafts 26 and 27 continuously rotate, the cam 85 also rotates to cause the levers 87 and 90 to oscillate about their respective axes of rotation. When the lever 90 oscillates in a clockwise manner (Figure 2), the ratchet 93 and its associated gear 92 is likewise rotated in a clockwise manner, and this rotation of the gear 92 will impart counter-clockwise rotation to shaft 81 by way of a pinion 97, said pinion 97 being fixedly mounted on the shaft 81, and meshing with the gear 92. As the roller 86 moves from a high side of the cam 85 to a low side, the spring 96 will cause the lever 90 to rotate in a counter-clockwise manner, during which time the shafts 91 and 81 will remain stationary, therefore, the roller 80 and the belt 82 will remain in stationary positions.

It is while the above-mentioned shafts 91 and 81 are in a stationary position that batches of material 21 and 22 accumulate. Then when a predetermined number of folds have been deposited in a batch, the proper intermittent advancement of the belt 82 is produced by the cam 85 so that the accumulated batch will be removed and another begun. In removing a batch, the two top layers are unfolded to become the connecting link between the top of the formed batch and the bottom of the next batch to be formed. While the cam 76 is making a half revolution, it is seen that roller 86 will be held in one position from points 73 to 72. From point 72 to point 74, the lever 70 will be swung in a clockwise manner to impart movement to the conveyer belt 82. This will move a set of folds which later form a complete set of bandage tails away from beneath the folding mechanism. At point 74, it will be observed the lever 70 will be allowed to swing in a counter-clockwise manner again, and when it moves in a counter-clockwise manner, it will give a longer movement to the conveyer belt from points 73 to 72 to space the two batches of the set of folds forming a bandage tail, so as to position the folds along the belt 82 as shown in the drawings.

As a means for preventing counter-clockwise rotation of gear 92 and shaft 91 together with the members driven thereby while the lever 90 is rotated in a counter-clockwise manner, a suitable roller 100 has been fixedly mounted on shaft 91. Upon this roller a friction strap 101 is mounted, said strap having the ends thereof fixedly secured to a fitting 102. Suitable springs 103 have one end thereof attached to the fitting 102 and the other end thereof secured to the framework 25 so as to produce the desired friction between the strap 101 and the roller 100. This amount of friction can be easily overcome during the operation of the machine when the lever 90 is rotated in a clockwise manner in Figure 2, but it is sufficient to hold the shaft 91 and roller 100 in a stationary position when counter-clockwise rotation is imparted to this lever.

Means are provided whereby the spaced interconnected batches of web material 21 and 22 may be compressed subsequent to the same being deposited upon the top of conveyor belt 84. This compressing means comprises a second belt 105, which is mounted on rollers 106 and 107, the lower section of said belt 105 being disposed immediately above the spaced batches of material which, in turn, rest upon the lower belt 82. The proximate faces of belts 82 and 105 are disposed in angular relation to each other. In other words, the distance between the upper proximate faces of belts 82 and 105 is somewhat greater than the distance between the lower proximate faces, thereby providing a wedge shaped space therebetween for the reception and compression of the folded material as the two belts advance the same therebetween.

The relative positions of the rollers 83 and 106 is such that the proximate faces of the respective belts 82 and 105 will contact each other at the lower portion of belt 105 when no material is disposed therebetween. In order to guide the lower intermediate portion of belt 82 in such a manner that it will not contact the upper portion of this same belt, a suitable roller 109 is provided, said roller having its ends rotatably mounted in bearings 110 on framework 25.

The roller 107 is driven intermittently from shaft 91 by means shown in Patent No. 2,336,051.

After passing between the belts 105 and 82, the batches 21 and 22 of the material are compressed so that the folds therein will retain their compact position while a tack stitch 23 is being placed therein in the manner shown in Figure 3. The left-hand portion of Figure 2 shows a suitable sewing mechanism comprising a needle 118 and a base support 119, said mechanism being employed for releasably sewing the folds of the individual batches 21 and 22 together. This operation is usually performed manually by an operator. Therefore, the production of the pleating mechanism is so timed that the operator can releasably tack the folds of each batch as it moves off the conveyor belt 82.

The above described tail pleating apparatus is schematically shown in the upper right-hand portion of Figure 1. When a continuous tail has been pleated in the manner shown in Figure 3 so that the folds of the individual pleated batches are releasably attached together, the pleated tail is then positioned longitudinally upon a strip of bandage material and secured thereto. This bandage strip is formed in a continuous length by an apparatus such as disclosed in Figures 4 and 14 inclusive. One method of attaching the pleated strips of material to the bandage strip is to simultaneously feed the bandage strip as it is being formed beneath a continuous pleated tail as it is formed, and then to unite and sever the strip and tail at the proper points. In this manner separate shorter lengths of the bandage strip and the attached pleated tail will be formed. The bandage strip former may be such as disclosed in Figures 4 to 8 inclusive, or one such as shown in Figures 9 and 10, or yet another such as shown in Figures 11 to 14 inclusive.

The above recital reference characters are identical to the reference characters in my Patent No. 2,336,051 of December 7, 1943.

*Bandage strip former*

Referring more particularly to Figures 4 to 14 inclusive of the drawings, the numeral 210 denotes a framework for supporting the cover sheet roll and the primary forming mechanism therefor. In the form of the invention shown in Figures 4 to 8 inclusive, a single sheet of cover material such as gauze or the like is folded upon itself in a substantially U-shaped position while the same is travelling. This U-shaped sheet of material is then fed through a forming apparatus at an angle to the longitudinal travel of a continuous lap of filler material, and when the U-shaped cover reaches the former, it is turned inside out over the former and lap of material and then directed in an opposite direction to the direction of travel of the lap, but on the outside of the former tube. While travelling in this opposite direction, the two edges of the folded sheet of material are united by a seam to form a tubular member, after which the tubular member is turned inside out at the end of the former and reversely directed over the lap of filler material. The framework 210 supports the cover sheet roll and the primary forming mechanism in such relative positions that the cover sheet will properly enter the secondary forming mechanism. The full details of this bandage strip former is shown in my Patent No. 2,352,354 of June 27, 1944, and the reference characters herein are the same as in said patent with the numeral "2" or "3" before the reference character, for example, reference character "10" in said patent is "210" herein.

By observing Figure 4, it can be seen that the framework 210 has rotatably mounted therein a vertically disposed shaft 212, said shaft projecting upwardly above the top of the framework a substantial distance and being adapted to support therearound a roll 214 of cover material 215. This roll 214 is adapted to rest upon a suitable base plate which is fixedly secured upon the intermediate portion of shaft 212 as shown in said last named patent. A suitable washer or hub 218 is disposed around this same shaft, above the roll 214, to thereby create the necessary friction between the roll 215 and associated plate and cause shaft 212 to turn as the material 215 is unwound.

It is necessary to provide means for retarding the rotation of roll 214 and shaft 212 as the material is unwound. Therefore, a grooved pulley 220 is fixedly secured upon the shaft 212, said pulley having the intermediate portion of a cord or flexible member 221 engaging a substantial portion of its periphery. This cord has one end thereof secured to the framework 210 as at 222, and has its other end weighted as at 223, thereby causing the cord to frictionally engage the pulley groove and thus retard its rotation. It will be noted that the portion of cord 221, which is directly above the weight 223, is adapted to pass downwardly and through an opening 224 in a bracket 225. The purpose of this bracket is to maintain the intermediate portion of cord 221 at the proper elevation relative to pulley 220, while the weight 223 creates the necessary friction.

After leaving the roll 214, the sheet of material 215 passes around a cylindrical knurled guide roll 226. The guide roll 226 is fixedly mounted upon a shaft 227, which, in turn, is rotatably mounted in the framework 210.

The primary forming stages of the cover sheet 215 are effected immediately after the material leaves the cylindrical roll 226. This forming mechanism comprises a board 230 which has an arcuate periphery over which the cover slides. The vertex of the arcuate periphery of board 230 is disposed substantially along the longitudinal center line of the cover sheet 215, therefore the edges of the sheet of material will be curved inwardly toward each other at the upper and lower portions of the periphery so as to be concavo-convex in cross-section. Board 230 is supported by a rod 231, which, in turn, is adjustably secured in a bracket 232. This rod may be moved longitudinally of the bracket 232 and adjusted to different positions by manipulating a set screw 233. Bracket 232 is adjustably secured on a vertically disposed rod 234 by means of a set screw 235, said rod 234 having its lower end supported by the framework 210.

When it is desired to swing the board 230 around the rod 234 as an axis, it is only necessary to manipulate the set screw 235. It is, of course, evident that by rotating the board 230 about rod 234, the amount of fold produced in the cover sheet 215 can likewise be varied. For example, the smaller the angle produced between the forming board 230 and that portion of the material which is disposed to the right of the former 230 (Figure 4), the less will be the amount of fold produced in the cover material. On the other hand, should the former 230 be disposed at right angles to the path of travel to the sheet of the material 215, then the amount of forming would be at a maximum.

*Secondary cover forming mechanism*

After the primary forming stages have been effected and the sheet of cover material 215 has been folded along its longitudinal center line, it is fed into a forming apparatus broadly designated by the reference character 237. By observing Figure 5, it can be seen that the forming apparatus 237 has a U-shaped groove therein, the length of which is substantially the same as the width of the cover sheet 215. Also it will be noted that this groove serves to further bend or fold the cover sheet to a position where the upper and lower plies will be substantially parallel, and where the edge of the upper ply will be disposed directly above the edge of the lower ply.

*Tertiary bandage cover forming mechanism*

The U-shaped cross-sectional formation of the cover sheet 215 is maintained until the sheet reaches angularly disposed guide edges 239, said edges 239 being disposed above and below the horizontal center line of the former 237 as shown in said last named patent. In the present disclosure, the edges 239 are cut substantially at a 45° angle to the line of travel of the sheet of material 215 as it approaches the former 237. The purpose of these edges is to turn the U-shaped cover inside-out into a second U-shaped cover and to change the direction of travel of the cover at a right angle. In other words, by providing angularly disposed edges 239 at the point of change in direction of travel of the fabric cover, it is possible to locate the source of cover supply, such as roll 214, along one side of the bandage forming apparatus 237, and at the same time, maintain a positive control of the folded edges of the material while it travels beneath the sewing mechanism which, in turn, forms a tubular fabric from the material.

By observing Figure 4, it can be seen that the angularly disposed edges 239 form one end of a second U-shaped member 240, and this U-shaped member has a hollow member 241 disposed therein. (See Figure 5.) The outer side walls of member 241 are disposed in spaced relation to the inner walls of U-shaped member 240 thereby forming a U-shaped groove 243. It is in this U-shaped groove 243 that the turned tubular fabric 215 is adapted to travel, said groove 243 being disposed substantially at right angles to the groove previously described.

Although the grooves are shown at right angles, it is evident that any desired angle could be present between these grooves without substantially changing the results, provided the edges 239 are cut at the proper angle to cause the folded material to feed from one groove to the other.

The open ends of U-shaped member 240 converge toward each other as at 240a thereby providing means for guiding the superposed edges of the cover material 215 toward each other prior to uniting the same. These superposed edges of the cover material are united by a seam 248 or by other suitable means, said seam being provided by means of a sewing mechanism broadly designated by the reference character 250.

*Seam guiding mechanism*

Seam 248 forms the cover sheet into a tubular fabric, which at the time of formation, encases the exterior of the hollow forming tube 241. Since it is usually necessary to provide the seam 248 a substantial distance from the edges of the upper and lower cover folds, it is evident that projecting edges 215a will be provided beyond the seam. As heretofore stated, these projecting edges will serve to create a rib adjacent the seam line if the same are not properly folded into parallel position to one face of the cover shell. In the present form of the invention, means are shown whereby both of these edges will be folded into parallel positions to each other and also parallel to one of the faces of the tubular member prior to the tubular member being turned and reversely directed over a lap of filler material to form a bandage strip.

In the disclosed form of the invention the bandage is substantially rectangular in cross section and is adapted to have one face especially provided for contacting an injured portion of the body. Therefore, it is only necessary to turn the projecting edges 215a in a direction so that the same will be remotely disposed from the contact face of the bandage and away from the injury.

In order to effect this turning of the edges 215a, a suitable guide wire, or similar mechanism 252, is provided on the exterior of the hollow forming member 241 and near the end thereof (Figure 7). The seam 248 first engages the guide member 252 substantially along the horizontal center line of the hollow member 241 after which the seam is gradually directed upwardly in the manner shown in Figure 6. As the seam rises upwardly and travels longitudinally of the former 241, the projecting edges 215a are gradually turned over to the top side of the tubular fabric so that the edges will be parallel to the top face prior to turning the tubular member inside out and reversely directing the same to the interior of the hollow member and over a rectangular filler material 253, said filler material usually being cotton which is carded in such a manner that the fibers are disposed substantially parallel to the longitudinal center line of the bandage strip.

Figures 4 and 8 show the method of turning this tubular member inside out and reversely directing it to the interior of the former 241. When the edges 215a reach the end of tubular member 241, these parallel edges are disposed on the top side of the tubular member as well as on the top side of the former 241. At the point of reversal, the tubular member and the projecting parallel edges 215a are fed into the interior of the former 241 to encase the filler material 253. Therefore, the projecting edges 215a will be turned to the inside of the tubular member and in a position where the same will be disposed between the filler material and the interior face of the tubular cover. In other words, the projecting edges 215a will extend away from the contact face of the bandage material so that seam 248 and the associated projecting edges 215a will not serve to irritate an injury upon which the bandage is placed. This operation completes the formation of the bandage strip or pad. As the encased filler material passes from the former 241, it is gripped by any suitable drafting means such as rollers 257 and 258 (Figure 4). These rollers are disposed upon shafts 259 and 260, said shafts having intermeshing gears 261 and 262 respectively for driving the same. Shaft 259 extends to a gear reducing mechanism 263 which is driven by a motor 264, said mechanism 263 having a shaft 265 extending therefrom upon which a pulley 266 is mounted. Upon this pulley 266 a belt 268 is mounted, said belt being also mounted upon another pulley 269 of the sewing mechanism 250. This arrangement permits the sewing mechanism 250 to be operated in timed relation to the movement of the filler and cover materials.

The seam 248 is preferably of a contrasting color to the bandage strip so that the seam will serve as an indicator when the strip is formed into a bandage, sanitary napkins and the like. In other words, if the seam is red and the bandage is white, the user can ascertain at a glance that the red seam should be remotely positioned from the body surface upon which the bandage, napkin, or the like is placed.

It is therefore seen that means have been provided whereby the cover material may be fed sidewise into the former at an angle to the path of travel of the filler material, and that the edges of this cover material may be folded into substantially parallel superposed positions to each other so that the same may be formed into a tubular cover, and then employed to encase a filler material to form a completed bandage strip or pad.

Modified form of seam guide

Figures 9 and 10 show a slightly modified form of the invention in which means are incorporated for rotating the tubular fabric around the hollow former 241 so that the seam 248 can be caused to occupy any desired position relative to the outer periphery of the filler material 253. In other words, it is often necessary to unite or seam the edges of the filler material when the same are disposed at one point on the periphery of the hollow former 241, and to subsequently rotate the seam and tubular member around the hollow former to another point on the periphery. This rotation may be as much as 90 degrees to locate the seam in the most remote position from the side edges of the bandage strip, while the tubular member is travelling in a general longitudinal direction.

The above-named rotation of the tubular cover is effected by means of a guide wire 275 and a guide plate 276. It is seen that the guide wire 275 has one end thereof secured to the outer side edge of the former 240 as at 277, said point 277 being disposed slightly below the horizontal center line of the former. The guide wire then gradually extends upwardly and outwardly for a substantial length of the tubular member, and then it extends inwardly above the former towards the longitudinal center line. The other end of the wire is secured as at 278 to the upper side of the former 241. When looking at the wire 275 in plan as shown in Figure 9, its shape resembles the letter S, and this wire causes the seam 248 to gradually travel inwardly towards the center of former 241. A plate 276 is provided, said plate having a guiding edge 276a which cooperates with the guide wire 275 and serves to further direct the seam 248 inwardly towards the center line of the former. At the same time, the edge 276a rotates the tubular fabric further around the former 241. The two projecting edges of the tubular member are directed into parallel relationship to one of the faces of the tubular member, therefore, these edges will occupy a minimum amount of space and create a smaller rib in the completed bandage strip. The seam 248 and the projecting edges 215a are disposed in the above-named parallel positions before the tubular member is turned inside out and reversely directed to the interior of the former, as well as after turning and reversing. This type of bandage construction is employed when it is desired to remove the seam line 248 and projecting edges 215a still further from the side edges of the finished bandage.

Modified bandage forming structure

Figures 11 to 14 inclusive show still another modified form of the invention in which some of the same principles employed in the preceding form are present. In this form, however, means are provided for making a tubular cover out of two or more sheets of material and then reversing the tubular cover over a bat of filler material to form a bandage strip. This type of construction is preferable where it is necessary to employ one type of cover material upon the contact surface of the bandage and another type of cover material upon the surface which is removed from this contact surface.

Referring to Figure 11, a roll of material 285 is provided from which a sheet 286 passes. This sheet 286 travels downwardly beneath a roller 287, and then horizontally adjacent the upper side of a hollow former 288. (See Figure 12.)

At the same time, another sheet of material 289 passes upwardly from a roll 290, over a roller 291, and then horizontally below former 288 in a substantially parallel position to the sheet 286. It should be noted that the sheet 286 passes above the form 288 while the sheet 289 passes beneath this same form, both of said sheets being somewhat wider than the form to thereby provide projecting edges which can be united by any suitable means such as seams to form a tubular cover around the former 288.

The upper sheet 286 has its edges pressed downwardly upon the upper side of the former 288 and upon the edges of the lower sheet 289 by means of a suitable brush 293. Immediately after the edges of the two sheets 286 and 289 have been pressed together in the manner shown in Figure 11, they are united by sewing mechanisms 294 and 295, which, in turn, form seams 296 and 297 respectively along opposed outer edges of the former 288.

As in the preceding case, the projecting edges 286a and 289a, which are disposed beyond the seams 296 and 297, must be folded into parallel positions to one of the faces of the cover material so that a minimum rib will be produced adjacent the seam line in the finished bandage. In order to effect this turning of the projecting edges substantially as described, suitable guide wires 299 and 300 are provided at opposed edges of the former 288 and adjacent the end of the forming tube where the material is reversed therethrough. It can be seen by observing Figures 12, 13 and 14 that the guide wires 299 and 300 extend outwardly and upwardly so that the seams 296 and 297 will be guided accordingly. In other words, the guide wires 299 and 300 have one end thereof attached near the lower edges of the tube 288 as at 299a and 300a respectively. It is at these points that the seam first engages the guide wire after the tubular member has been formed. The seam then follows the guide wires upwardly until the seam has been elevated to substantially the same position as shown in Figure 14 and at this elevation the projecting edges 286a and 289a have been folded into parallel positions relative to the top layer 286. It will also be noted that the upper end of wires 299 and 300 are secured near the end of the tubular member 288 as at 299b and 300b respectively. When the tubular cover reaches the end of the hollow former 288, it is turned inside out and reversely directed through the interior portion thereof and over a bat of filler material 302 to thereby form a finished bandage strip or pad in which the projecting edges beyond the seams are remotely disposed from the contact face of the bandage strip or pad. After leaving the former 288, the finished bandage strip passes between suitable drafting rollers 303, and 304, said drafting rollers serving to pull the cover sheets 286 and 289 from their respective rolls and also to pull the bat of material through the former along with the tubular cover.

Tail attacher and cross-cut mechanism

The mechanism for attaching the pleated tail to the bandage strip and subsequently severing the attached parts is shown in Figure 15, and is more fully described in my Patent No. 2,352,355 of June 27, 1944. By observing Figure 15 it can be seen that the bandage strip is fed beneath a pleated tail and the strip and superposed tail are attached together and subsequently severed or subdivided into shorter lengths. After this severing and attaching step has been effected, a subsequent operation is necessary in order to sever the attached tail intermediate the attaching points so that two separate attached tails will be provided. This severing of the attached tail intermediate the ends, however, is usually effected manually and not by the tail attacher and cross-cut mechanism.

Referring more particularly to Figure 15 of the drawings, the numeral 411 indicates an overhanging goose-neck which supports a needle operating and a presser-foot mechanism. The outer end of goose-neck 411 has lugs 414 and 415 integral therewith which serve as bearings for parts hereinafter to be described.

Lug 415 has mounted therein for vertical sliding movement a shaft 416. Around the shaft 416 and disposed above lug 415 are a pair of superposed collars, the lower one 419 being shown, said collar 419 serving as a stop to limit the downward movement of the shaft. By observing the drawings, it can be seen that the collar 419 has extended therefrom a laterally disposed pin 426 which, in turn, penetrates a vertically disposed presser-foot shaft 427. This presser-foot shaft is mounted for vertical sliding movement in lug 415, and the lower end of the shaft has a bracket 429 fixedly secured thereon, upon which a presser-foot 430 is pivotally secured as at 431. During the normal operation of the machine, the presser-foot 430 is adapted to rest above the upper surface of a bobbin or looper housing shown in said last recited patent. The reference characters for the tail attacher are the same as in my Patent No. 2,352,355 except that herein the numeral "4" precedes the reference character in the patent.

By observing Figure 15, it will be noted that the presser-foot 430 has a pair of spaced holes 436 therein which are adapted to be penetrated by a pair of needles 437 on the lower end of a needle shaft 438. This needle shaft is mounted for vertical reciprocatory motion in the lugs previously described. The operating means for the conventional parts 437 and 438 are not shown, however, it might be stated that during operation, the shaft 438 and associated needles 437 reciprocate up and down to cause associated needle threads 439 to penetrate presser-foot holes 436 and the fabric therebeneath, and also to cause these threads to become interlocked with a conventional bobbin or looper thread, not shown.

As heretofore stated, it is desirable to provide a base strip which continuously moves beneath the presser-foot 430 and above the bobbin or looper casing to form a ground work in which the bobbin or looper threads and needle threads are united when the machine is continuously operating and when there is no other material beneath the part 430. With this in view, a suitable reel of tape 446 is provided, said tape 446 being normally disposed beneath the machine and extending upwardly to the presser-foot 430. The tape passes horizontally beneath a guide loop 448. During the operation of the machine, suitable conventional feeder dogs engage the bottom of the tape 446 and press it upwardly and rearwardly against the bottom of the presser-foot 430 to advance the tape and associated fabric.

A specific illustration of the use of the present invention is illustrated in Figure 15. In the manufacture of bandages, it is often necessary to attach tie tapes to bandage strips and to simultaneously sever the strips and tapes intermediate the attaching seam line. For example, a bandage strip 455 is initially formed with a sufficient length for making several bandages. Likewise, tie tapes 456, which are to be secured to the bandage strips, are sufficiently long to form several tie strips on the finished bandages; consequently, a series of assembled parts 455 and 456 are successively passed beneath the presser-foot and above the transversely disposed strip 446 to cause the tie tapes 456 to be successively sewed to the associated bandages 455 by a pair of parallel seam lines 457, these seam lines being also formed in base strip 446 by needles 437. Since it is impractical to keep a bandage strip 455 and tie tape 456 beneath the presser-foot 430 at all times when the machine continuously operates, it is necessary to provide the base strip 446 so that there will be ground work in which the seams 457 can be placed to prevent the bobbin or looper threads from becoming entangled.

It is desirable to provide a yielding means for normally forcing the presser-foot 430 and its associated parts downwardly upon the workpiece which is disposed therebeneath.

A foot-actuated mechanism is provided for raising the presser-foot 430 when desired. This is shown in my last recited patent.

The above-described sewing machine is operated through a conventional driving mechanism, as shown in my last recited patent.

It is seen by observing Figure 15 that when a bandage strip 455 and tie tape 456 pass beneath the presser-foot 430 and above the base strip 446, the portions 455 and 456 are united by a pair of spaced parallel seam lines 457. The next operation in the manufacture of the bandage is to sever the members 446, 455, and 456 along lines substantially midway between the seam lines 457 to thus form a separate tie strip 456a attached on the end of each bandage strip 455a. This severing is effected by a rotary disc 485 which has its lower cutting edge rotatably mounted in a slot 486 cut in base plate 487, said base plate being mounted on top of the bracket 433, immediately behind the presser-foot 430. The driving means for disc 485 is shown and described in my last recited patent.

It is thus seen by observing Figure 15 that when the strips 455 and tie tapes 456 are assembled upon base strip 446 and successively moved transversely beneath the presser-foot 430, the parts will be united by a pair of parallel seam lines 457. When the assembled strips 455 and 456 are spaced some distance apart, the machine will place seams 457 in the base strip 446 only at the spaces where a bandage strip 455 and tie tape 456 is absent. Immediately after the seam lines 457 are placed in the members 455 and 456, the united members 446, 455, and 456 are moved longitudinally beneath rotary blade 485 to thereby sever the united portions along a line substantially midway the seam lines 457 to thereby produce a pair of bandage strips 455a also together with the attached severed tie tapes 456a. A split portion 446a of base strip 446 will also connect the bandage strips on each side of the rotary disc 485.

Although the present invention is shown and described in connection with a multiple needle sewing head which is employed for sub-dividing bandage strips 455 and the associated tie tapes 456 into two bandage strips, each having a tie tape secured thereto, it is to be understood that the present invention could be employed for attaching the end of a single tie tape 456 to the end of a single bandage strip 455 by a single seam line, and then trimming the overhanging edges along a line substantially parallel to the seam line. In other words, a single needle sewing head can be employed along with the base strip 446 and when the ends of the tie tapes and associated bandage strips are united, the end of these parts could be subsequently trimmed by the rotary knife 485. Of course, when the method is carried out in this manner, the production will be approximately one-half of the production when carried out in the manner disclosed in Figure 15.

It is evident that after the tail has been attached to the bandage strip and these parts have been severed into shorter lengths, the opposed ends of the lengths will have a raw cut edge. These raw cut edges are very undesirable because the projecting fibers will extend therefrom and create an unsightly appearance as well as fall from the bandage when the same is handled in subsequent operations. Therefore, it has been found necessary to bind each of the raw cut edges by employing U-shaped binder strips. Since the tail attacher and cross-cut mechanism continuously attaches the tails upon successive bandages and then severs the attached parts into shorter lengths, it is desirable to provide a duplex binder mechanism for taking the output of the tail attached and cross-cut mechanism and successively binding the opposed ends of the bandages. The broad idea employed in successively binding the sub-divided bandage lengths is shown in Figure 1, however, the specific structure of this binding mechanism is shown in detail in Figures 16 and 17 of the drawings. In brief the bandages which come from the tail attacher and cross-cut mechanism are alined in parallel positions alongside each other and then fed sidewise between two continuous U-shaped binder strips, thus causing the opposed ends of the bandages to be enveloped in the binder strips. A duplex sewing mechanism is employed for attaching these continuous binder strips to all of the parallel bandage lengths. In other words, when the sewing mechanism has affixed the binder strips to the opposed cut edges of the parallel bandages and attached tails, it is necessary to shear or sever the binder strips at points between the bandages so as to separate the adjacent bandages from each other. The duplex mechanism is set forth in detail in my co-pending patent application, Serial No. 467,353, filed of even date, and in the following description the same reference characters are used with the numeral "6" or "7" placed before the reference characters used in the patent application.

Duplex binder mechanism

In Figure 16 the broad idea embodied in successively hemming bandages according to the present method is illustrated. It is here seen that a plurality of spaced bandages 610 are moved transversely in the direction of the arrow along with a pair of hem strips 612 and beneath needles 611. The hem strips are longitudinally folded by a suitable mechanism disclosed in the present application, so that the opposed ends of bandages 610 will be encased, and while in this encased position, the needles 611 secure the folded hems upon the bandage ends by means of seam lines 614. A puller mechanism, including intermeshing gears 616 and lower gears 617, are employed for drawing the sewed hem and associated bandages away from the sewing mechanism. It is thus seen that when the operation is completed, a series of spaced parallel bandages have the opposed ends thereof interconnected by a pair of continuous folded hem strips 612. Of course, it is necessary to sever each connecting hem portion along a line closely adjacent the bandage end before the finished bandage is ready for use. The continuous hem strips are always present beneath the presser feet, therefore, the sewing machine can operate continuously regardless of whether or not a bandage is disposed beneath the sewing machine presser-feet.

In the following description a pair of sewing machines 618 and 619 are employed for simultaneously placing seams 614 in the hem strips 612 and associated spaced bandages 610. These sewing machines and their associated parts are practically identical except one is opposite hand to the other. In the description reference will be made only to one of the machines, and like reference characters will be given to opposite-hand parts on the other machine. Where there is a material difference between the two machines, that is, where portions of one machine are not opposite-hand to the other, a full description will be made of this difference.

The first step in the operation of the present invention is to properly fold the hem strips 612 longitudinally of the path of travel and direct the ends of the bandages between the hem folds. The formers employed for folding the hem strips 612 longitudinally of the path of travel are designated broadly by the reference characters 620 and 621 associated with machines 618 and 619 respectively, the former on one side of the bandage being opposite-hand to the former on the opposite side. Each hem strip 612 enters a concavo-convex forming section 622, said section having its longitudinal axis disposed substantially at right angles to the path of travel of the spaced bandages 610 through the machine (see Figure 17). This hem strip is folded along its longitudinal center line in a concavo-convex manner, conforming to the shape of section 622, and when the bandage strip reaches turning point 622a, it is directed into another forming section 623 which is disposed substantially at right angles to the above-mentioned section 622.

When the hem strip first enters the forming section 623, it assumes another concavo-convex shape such as shown in said co-pending application. Particular attention is called to the fact that the upper and lower edges of the hem strip are rotated about the longitudinal center line at point 622a so that the concave side of the strip when in section 622 will be converted onto a convex side when it reaches section 623, and the convex side of the strip when in section 622 will be converted into a concave side when it reaches section 623.

As the hem strip travels farther into the section 623, it is gradually folded over the end of the bandage. It is seen in said co-pending application that the upper and lower edges of each concavo-convex forming section 623 have inwardly turned portions and serving to turn the upper and lower edges of the hem strip 612 inwardly in the same manner.

As the hem strip 612 continues to move longitudinally of the forming section 623, the upper and lower edges of the hem strip are folded inwardly to positions substantially parallel to the adjacent inner side walls of the strip. Therefore, it is necessary to shape the forming section in such a manner that recesses will be provided for guiding said upper and lower inturned strip edges.

As hem strip 612 moves to the end of section 623, it is further folded to a cross-sectional U-shape. When in this shape, the ends of the bandages 610 slide between the strip folds and then the parts move beneath the presser-feet of the sewing mechanism.

The opposed edges of the bandage are adapted to slide in the proximate concave portions of the forms, and as the bandage edges move longitudinally of the form sections 623, the upper and lower margins of the U-shaped hem strips 612 gradually encase these edges, and also encase the ends of the tails 610a which have previously been sewed to the ends of the bandages, as at 610b (see Figure 16).

Each of sewing machine units 618 and 619 is equipped with a presser-foot 625, which foot is pivotally secured as at 626 to the lower end of a presser-foot shaft 627. Shaft 627 is mounted for vertical reciprocatory movement as shown in said co-pending application.

As a means for supporting the materials 610 and 612 while beneath the presser-foot 625, a plate is provided, which plate also acts as a cover for a portion of conventional bobbin structure, not shown, but which is adapted to cooperate with the needles 611 and associated thread to form seam 614 in the materials. The needle 611 is fixedly secured upon the lower end of a vertically disposed shaft, said shaft being mounted for vertical reciprocatory motion as shown in said co-pending application. During the reciprocation of the shaft 637 and the associated needle 611, the needle is caused to penetrate a hole 625a in the presser foot 625 and also pierce the two folded layers of hem material 612 as well as the bandage structure 610 disposed therebetween. A hole is provided immediately below hole 625 in the presser-foot, said hole being adapted to receive the needle 611 after it pierces the fabrics thereabove. When the needle 611 pierces the lower hole, it contacts the bobbin thread, not shown, to form the seam line 614 previously described, so that the folded hem 612 will be successively united to the cut edges of the bandages.

The lower end of a link 651 which drives the needles as shown in said co-pending application, is coupled to an eccentric 652 on a shaft 654, said shaft 654 having a gear 655 fixedly secured thereon which meshes with another gear on drive shaft not shown. As the drive shaft rotates during the operation of the machine, the eccentric 652 is rotated to cause the needles to be operated.

Access is obtained to the bobbin housing by way of a slide plate 648a (see Figure 17). The plate has adjustably mounted on the upper face thereof as at 660 an angle bracket 661, the vertical leg of said angle bracket serving as a guide for the hemmed edge of the bandages 610 while disposed beneath presser-foot 625.

It is therefore seen that both machines 618 and 619 will be simultaneously operated to cause a pair of hem strips 612 to be fed through their respective formers 620 and 621 and over the opposed edges of the bandage 610. These bandages have their opposed edges fitting into the proximate concave faces of forming sections 623 in such a manner that the upper and lower margins of the folded hem strips 612 will encase the ends of the bandages 610 prior to the bandages reaching the needle 611, and before the ends of the bandage pass from between formers 620 and 621. Immediately after leaving the formers, however, the folded hem strips move into contact with the bandage ends so that the sewing mechanism can seam the parts together.

Since the bandage strips 612 are continuous, it is possible to continuously operate the sewing machines 618 and 619 when a bandage is not present beneath the presser-foot without entangling the bobbin and needle threads, because a piece of hem material 612 will always be disposed beneath the presser-foot to serve as a base in which the bobbin and needle threads can be united.

After the seams 614 have been placed in the hem material 612 and in the associated bandages 610, the sewed material then passes between two intermeshing puller gears. The intermeshing gears grip the upper and lower surfaces of the hem material and thereby pull the material away from the presser-foot in timed relation to the operation of the needles.

Throughout the specification reference is made to a bobbin mechanism together with an associated bobbin thread. The invention, however, is not limited to machines employing a bobbin mechanism, because a conventional looper which employs only one thread may be used with equally good results.

When the duplex binding apparatus has performed its operation, the fabrication of the bandage has been completed.

Figures 18 to 29 show the detail structure of some forms of bandages made in accordance with the present method. The disclosure in these figures may vary slightly from that in Figure 1 of the drawings, however, it is thought that by disclosing the specific structure of several forms of bandages, a better idea of the novel method employed for the bandage manufacture can be obtained. In the following description the last two numerals of the reference characters are the same as in my Patent No. 2,337,011 on the bandage construction.

*Bandage construction*

Referring more particularly to the drawings, (Figures 18 to 21 inclusive) the numeral 810 denotes an elongated bandage strip or body portion which is usually formed from a layer of non-absorbent material 811 and another layer of absorbent material 812 such as cotton or the like. The top and bottom of the assembled layers 811 and 812 have gauze coverings 814 and 815 respectively, the side edges of said gauze coverings being seamed as at 816 and 817 to form a tubular member. When the tubular member is first formed, the seams 816 and 817 are disposed inwardly from the side edges and therefore, each covering 814 will have a projecting edges 814a beyond each seam line 816 and 817, and likewise each edge of gauze covering will have a projecting edges 815a beyond these seam lines.

Since the cover 814 is adapted to be positioned adjacent the wound, it is usually necessary for it to be made of a higher grade material than the cover 815 on the other side of the bandage. Therefore, by employing a two-piece tubular member, the cost of manufacture may be materially reduced without affecting the quality of the finished product.

If desired, the cover 814 can be made of absorbent material since it is adapted to be placed in contact with the wound surface, whereas, the cover 815 can be made of non-absorbent or even water repellent material to prevent external moisture from penetrating the bandage and infecting the wound.

It will be noted in Figure 19 that the edges 814a and 815a are disposed on the inside of the tubular covering. These edges are directed to this position during manufacture by a special process and apparatus shown and described in my co-pending patent application Serial Number 467,351 filed of even date, now Patent 2,352,354 of June 27, 1944. It might be stated, however, that the edge portions 814a and 815a are initially on the outside when the tubular member is formed, but when the layers 811 and 812 are inserted, the tubular member is simultaneously inverted so as to place the edges 814a and 815a also on the inside. The bandage is shown and described in my Patent No. 2,337,011 of December 14, 1943.

It will be further noted that the edges 814a and 815a both project away from the gauze covering 814 and away from the layer of absorbent material 812. In other words, the edges 814a and 815a are disposed alongside the covering 815 and substantially in parallel relation thereto. By thus positioning the edges 814a and 815a within the tubular covering, the edges will be farther removed from the contact cover 814 of the bandage. It is, of course, realized that the gauze covering 814 and the absorbent layer of material 812 should be disposed adjacent the wound or injury; consequently, layers 811 and 812, as well as cover 814, will shield the wound from any injury or discomfort which might be produced by edges 814a and 815a.

Another important factor in the construction of the present bandage is in the direction in which the fibers in the layers 811 and 812 project. The fibers in each of the layers 811 and 812 are combed during the carding operation so as to extend longitudinally of the bandage. These fibers are all therefore substantially parallel and consequently, when the bandage is compressed for shipment, the compression can be directed with relation to the fibers in such a manner that the least possible permanent creasing will be produced. The compression of the present bandage and the mechanism therefor is shown and described in another co-pending patent application Serial Number 467,354 filed of even date herewith.

When the body portion 810 of the bandage is formed, suitable transversely disposed spaced marks 818 are placed on the face of contact gauze covering 814. These marks are located apart from each other a distance substantially the length of a completed bandage 819, and thus serve to indicate the position where the body portion is to be cut, as well as where the securing means for individual bandage are to be attached.

One of the most convenient methods of attaching a bandage to a patient's body is by means of suitable flat elongated tie tapes. These tie tapes may be employed for encircling a limb of the patient's body and for quickly securing the bandage in place over a wound. It is to be understood, however, that other means may be employed such as adhesive tapes, strings, pins, or the like without basically departing from the spirit of the invention.

In Figure 20 two tie tapes 820 are shown secured to the end of the bandage 819 nearest the observer by a seam line 821. These seam lines are parallel to indicating marks 818 but spaced a slight distance inwardly of the bandage therefrom, and serve to close the ends of the bandage as well as to secure the tie tapes thereto. It will be noted that the tie tape 820 extends longitudinally over the top of bandage 819 and is secured again to the body portion on each side of mark 818 by means of a pair of parallel rows of stitches 821. These stitches, if desired, may be formed by a double-needle sewing machine or in any other suitable manner, but after the stitches have been formed, the body portion 810, as well as the tie tapes 821, are severed along line 818 approximately midway between the rows of stitches 821 to thus sever a bandage unit 819 from the portion 810. Of course, after this bandage unit is severed, both cut ends will appear substantially the same as the near side of Figure 20.

It will be further noted by observing Figure 20 that each tie tape 820 is folded upon itself a plurality of times to form spaced batches 822. In fact, there are two such batches 822 in each tie tape 820, said batches being connected by a short strip of material 822a. Also these batches of material are releasably held together by any suitable means such as tack stitches 823, or the like. When the bandage unit 819 has been secured as above described, each tie tape 820 has the ends thereof secured to the ends of the bandage unit, and also has its intermediate portion 822a unsevered. Then the portion 822a is severed to form two tie strips 820a from each strip 820, and at this stage, each tie strip 820a will have its end formed into a batch 822.

The next step comprises the binding of the ends of the unit 819 to complete the bandage. This binding also serves to additionally secure the tie strips 820a to the ends of the bandage as well as to bind the loose fiber upon the cut ends of the bandage. A piece of binding material 827 is folded over the end of bandage unit 819 and over the end of the secured tape 820a. Then, the material 827 is secured to the end of the bandage and to the tapes 820 by means of a second line of stitches 828, thereby forming a rectangular bandage having all four edges completely covered, and having the tie strips folded together in batches so that the same will occupy a minimum amount of space when handling the bandage.

Figures 22 to 25 inclusive show another form of surgical bandage 830 which is similar to the preceding form except as to the manner in which the tie tapes are attached to the bandage ends. Therefore, parts in this form of the invention which are identical to parts in the preceding form will be given similar reference characters and only a description will be made of the parts which materially differ in construction.

Specifically the difference in the present form of the invention resides in attaching the ends of each tie tape to the end of the bandage by means of two separate seam lines, and in having that portion of the tapes between the two seam lines encircling the raw end of the bandage. By observing Figure 23, it can be seen that the end of tie tape 831 is first attached on the bottom side of the bandage structure by means of seam line 821. In the preceding form, the tape is attached in a similar manner except it is attached only on the top side of the bandage. The next step in the formation of the present bandage 830 is to wrap the attached tape 831 around the end of the bandage to the top side and over the seam 821. After this has been done, the binding material 827 is employed to encase both the end of the bandage and portions of the above-named tapes 831 in the manner shown in Figure 24. Then a second seam line 828 is employed for securing the binding in position on opposed sides of the bandage, and also for additionally securing the end of each tape to the end of the bandage.

This type of construction is particularly valuable where the strength of the tie tape is limited. In some cases a very thin mesh gauze is employed as a tie tape, and consequently, much difficulty is obtained in providing a dependable connection to the bandage. By causing one end of each tie tape to encircle the raw end of the bandage, and then securing the tape on opposed sides of the bandage by a pair of stitch lines, the connection is made more dependable, and therefore, the likelihood of the tie tape pulling loose is very much reduced.

In all forms of the invention, attention is called to the fact that the tie tapes are so attached to the bandage that they will form a continuation of one face of the bandage when in use. In other words, if the tie tapes on the opposed ends of the bandage are pulled in opposite direction, the tie tapes and one face of the bandage will lie substantially in the same plane. This is a very important feature, because it presents a uniform smooth contact surface against the patient's body when the bandage is applied to a wound, and thereby eliminates any ridges or objectionable formations in the contact area.

To further illustrate this feature, attention is called to Figure 25. In this figure the dotted outline of a patient's limb is designated by the reference character 835, and around this limb a bandage 830 is applied. The distended tie tape 831, that is, the unfolded batches 823, are used to hold the cover material 814 of the bandage in contact with the surface of limb 835 and suitable knots or bows 831a are employed for uniting the ends of the tie tapes. It is clearly evident that the objectionable ridges or ends of the bandage, around which the binding material 827 is placed, are positioned away from the surfaces of the limb and are thereby prevented from being a source of annoyance when the bandage is applied. On the other hand, the pressure exerted upon the surface of the limb 835 is necessarily uniform throughout the entire area of the bandage and also throughout the engaging area of tie tapes 831, because the tie tapes are a continuation of contact face 814.

Figures 26 to 28 inclusive show still another modified form of bandage 838, and also illustrates a new method of producing the same. In this form of the invention, a layer of absorbent material 839 is placed upon a layer of non-absorbent material 840, and the two materials are encased within a tubular fabric 841. This tubular fabric is preferably formed from a single sheet of gauze material, which is disclosed in said co-pending application Serial Number 467,351, now Patent No. 2,352,354 of June 27, 1944.

During the formation, however, the edges of the sheet material 841 are sewed together by a seam 842 at a substantial distance from the overlapped edges of the fabric, thus providing outwardly projecting edges 841a which are similar to the edges 814a and 815a described in connection with the first form of the invention.

The tubular member is then turned while the layers of material 839 and 840 are inserted therein, thereby placing edges 841a on the inside. Likewise, the edges 841a extend away from the absorbent material 839 and away from the contact side of the cover material 841, so that the edges will not irritate the patient's body when the bandage is applied to the wound.

The first step in the formation of this bandage comprises the attachment of one end of a broad tie tape 843 to the opposed cut ends by means of a seam line 844. The bandage may be cut to a predetermined length before attaching the broad tie strip 843, or, if desired, by a special process, the severing of the bandage and the attaching of the tape strips 843 by the seam may be done all in one operation. Each of these broad strips 843 has the unattached end thereof folded to form a batch 845, said batch being releasably secured in a unit by means of quickly removable tack stitches 846 or some other similar manner.

After the first attaching operation of the tie strips has been performed, each strip is wrapped around the cut end of the bandage 838 and over the top of the bandage until seam 844 is covered. At this time, a piece of binding material 847 is wrapped around the end of the bandage and the attached end of the tape material 843. The binding material and the tape 843 are then secured in position upon the cut end of the bandage by means of a second stitch line 848.

If desired, both tie strips 843 may be in one continuous length with its ends first attached to the bandage structure in the manner shown in Figure 20. Then the intermediate portion of the attached strip may be reversed to the opposite side of the bandage to cause the cut ends to be encircled by the ends of the strip, after which the binders may be placed in position in the manner just described. If this latter method is used, it will be necessary to sever the continuous bandage strips approximately midway between the seams 848 and batches 845 to thereby form a tie strip construction, such as shown in Figure 26.

The next step in forming a bandage of this type is in the provision of additional tie strips. In other words, it is desirable to have four tie strips attached to the bandage, two at each end, so as to effectively secure the bandage to the patient's body. In order to quickly provide these additional strips, the two batches on the respective broad tie strips 843 are placed side by side and in an extended position from the body of the bandage itself, in a position substantially as shown in Figure 27. Then the batches 843 and the associated tie strips are slit longitudinally substantially along dotted lines 849, thereby forming four tie strips 843a, each tie strip having a folded batch 845a on the end thereof which batch has its folds releasably secured together by a portion 846a of the tack stitch 846.

This severing operation may be produced in a number of ways such as by bringing the material into engagement with a rotary knife 850 or some other similar cutting implement.

When the tie strips have been formed in the manner shown in Figure 27, the bandage is again straightened to a substantially flat position and then two superposed batches 845a of tie strips 843a are folded longitudinally in one direction upon the bandage and the remaining superposed batches of tie strips are folded in the opposite direction, thereby providing a better distribution of the tie strip material which facilitates subsequent packing and compressing operations.

I claim:

1. That method of producing a bandage from a strip of fibrous material, a textile covering and a tie tape, the steps of which comprise forming said strip in a continuous length, providing a tie tape of a substantially greater continuous length than said strip, pleating said tie tape into accordion folds throughout its length until the overall length of the folded tape is substantially the same as that of the strip, attaching said tie tapes at two spaced points to said strip at spaced intervals, and then transversely severing the tie tape and bandage strip between the spaced points at the attaching intervals to thereby subdivide the strip and tape into relatively short units.

2. That method of producing a bandage from a strip of pad material, a textile covering and a tie tape, the steps of which comprise forming said strip in a continuous length, providing a tie tape of a substantially greater continuous length than said strip, pleating said tie tape into accordion folds throughout its length until the overall length of the folded tie tape is substantially the same as that of the strip, sewing said tie tape to said strip at spaced intervals by two spaced parallel rows of stitches, then transversely severing the tie tape and bandage strip between the rows of stitches at the attaching intervals to thereby subdivide the strip and tape into relatively short units, and then simultaneously hemming the opposed severed ends of said shorter units.

3. That method of making a bandage which comprises folding a strip of fabric along its longitudinal center line and sewing the edges of the folded strip while the fabric is moving to form a tube, axially rotating the longitudinally moving tube of fabric along its longitudinal center line, reversing the direction of travel of the fabric tube while turning the same inside out, feeding a filler into the tube of fabric, cutting the fabric transversely into bandage lengths, sewing a tail to each end of each bandage, and securing a binder strip over each end of the bandage to envelope the attached end of each tail sewed to the bandage.

4. That method of making a bandage which comprises folding a strip of fabric along its longitudinal center line and sewing the edges of the folded strip together while the fabric is moving to form a tube, axially rotating the longitudinally moving tube of fabric along its longitudinal center line, reversing the direction of travel of the fabric tube while turning the same inside out, feeding a filler into the tube of fabric, cutting the fabric transversely into bandage lengths and at the same time sewing a tail to each end of each bandage.

5. That method of making bandages which comprises continuously sewing the edges of longitudinally moving fabric together to make a tubular cloth member, turning the finished longitudinally moving tube along its longitudinal axis to reposition the seam, turning the tubular fabric inside out and feeding a continuous strip of filler material therein to form a bandage strip, sewing the ends of a tie tape to the ends of the bandage, and severing the tie tape intermediate its point of attachment to form a tie tape for each end of the bandage.

6. That method of producing a bandage from a strip of pad material and a tie tape, the steps of which comprise forming said strip in a continuous length, providing a tie tape of a substantially greater continuous length than said strip, pleating said tie tape into spaced batches of accordion folds throughout its length until the overall length of the folded tie tape is substantially the same as that of the strip, releasably securing the folds of said batches together, attaching said tie tapes to said strip at spaced intervals, and at the same time transversely severing the tie tape and bandage strip at the attaching intervals to thereby subdivide the strip and tape into relatively short units.

7. That method of producing a bandage from a strip of pad material and a tie tape, the steps of which comprising forming said strip in a continuous length, providing a tie tape of a substantially greater continuous length than said strip, pleating said tie tape into spaced batches of accordion folds throughout its length until the overall length of the folded tie tape is substantially the same as that of the strip, releasably securing the folds of said batches together, attaching said tie tape to said strip at spaced intervals and at the same time transversely severing the tie tape and bandage strip at the attaching intervals to thereby subdivide the strip and tape into relatively short units, and then simultaneously hemming the opposed severed ends of said short units.

8. That method of producing a packaged bandage from a strip of lap material and a tie tape, the steps of which comprise forming said strip in a continuous length, from a lap of material composed of longitudinally paralleled fibers, providing a tie tape of a substantially greater continuous length than said strip, pleating said tie tape into two spaced connected batches of accordion folds for each bandage with connecting unpleated portions connecting each set of batches until the overall length of the folded tie tape is substantially the same as that of the strip, releasably securing the folds of said batches together, attaching the unpleated portions of said tie tape to said strip at spaced intervals and at the same time transversely severing the tie tape and bandage strip at the attaching intervals to thereby subdivide the strip and tape into relatively short units, and then simultaneously hemming the opposed severed ends of said short units.

9. That method of making a bandage which comprises folding a strip of fabric along its longitudinal center line and sewing the edges of the folded strip while the fabric is moving to form a tube, axially rotating the longitudinally moving tube of fabric along its longitudinal center line, reversing the direction of travel of the fabric tube while turning the same inside out, feeding a filler into the tube of fabric, cutting the fabric transversely into bandage lengths, sewing a tail to each end of each bandage, forming the unattached end of each tail into accordion folded batches, releasably securing the folds in said batches together, and securing a binder strip over each end of the bandage to envelop the attached end of each tail sewed to the bandage.

10. That method of making a bandage which comprises folding a strip of fabric along its longitudinal center line and sewing the edges of the folded strip together while the fabric is moving to form a tube, axially rotating the longitudinally moving tube of fabric along its longitudinal center line, reversing the direction of travel of the fabric tube while turning the same inside out, feeding a filler into the tube of fabric, cutting the fabric transversely into bandage lengths, sewing a tail to each end of each bandage, forming the unattached end of each tail into accordion folded batches, and releasably securing the folds in said batches together.

11. That method of making bandages which comprises continuously sewing the edges of longitudinally moving fabric together to make a tubular cloth member, turning the finished longitudinally moving tube along its longitudinal axis to reposition the seam, turning the tubular fabric inside out and feeding a continuous strip of filler material therein to form a bandage strip, severing the bandage strip into short lengths suitable for bandages, sewing the ends of a tie tape to the ends of the bandage, and severing the tie tape intermediate its points of attachment to form a tie tape for each end of the bandage.

12. That method of producing a bandage from a strip of lap material and a tie tape, the steps of which comprise forming said strip in a continuous length, forming said tie tape in a continuous length, superposing said continuous tie tape upon said continuous strip, attaching said tie tape to said strip at spaced intervals, then transversely severing the tie tape and bandage strip at the attaching intervals to thereby subdivide the strip and tape into relatively short units, then simultaneously hemming the opposed severed ends of said short units, and then severing the attached tie tape intermediate its points of attachment to thereby provide additional tie tapes.

13. That method of encasing a lap of filler material within a tubular fabric, and forming the same into bandages, which comprises yieldingly pressing together the opposed edges of a pair of longitudinally moving strips of material and at the same time maintaining the intermediate proximate faces of said strips in spaced relation to each other, uniting said strips by a pair of seams disposed in parallel spaced relation to the outer edges of the strips thereby providing a tube having exteriorly projecting strip margins beyond each seam line, turning said tube inside out and feeding a lap of filler material therein, attaching a continuous tie tape at spaced intervals to said encased lap, and transversely severing the tie tape and encased lap at the attaching intervals to thereby subdivide the tape and encased tape into relatively short units.

14. That method of making bandages which comprises forming a continuous textile tube, and encasing a lap of fibrous filler material within the textile tube, forming a plurality of accordion folds in a continuous length of tape, then forming an elongated connecting link, then forming another batch or plurality of folds in the tape, then forming a more elongated connecting link extending from the last of the two batches, then forming other pairs of batches with connecting links therebetween and with longer connecting links between the pairs of batches, then superposing the accordion folded tape onto the strip of encased filler material, then sewing a tape transversely of the tie tape material and the bandage material by two spaced parallel rows of stitches, and at the same time severing the bandage material and the tie tapes between the line of stitches, then simultaneously placing a binder strip over each end of the bandage material and the ends of the tie tapes, thus providing a bandage having a tie tape secured at each end thereof having a pair of accordion folds in the tie tape between its secured ends.

15. That method of making bandages which comprises forming a continuous textile tube, and encasing a lap of fibrous filler material whose fibers extend longitudinally of the lap within the textile tube, forming a plurality of accordion folds in a continuous length of tape, then forming an elongated connecting link, then forming another batch or plurality of folds in the tape, then forming a more elongated connecting link extending from the last of the two batches, then forming other pairs of batches with connecting links therebetween and with longer connecting links between the pairs of batches, then superposing the accordion folded tape onto the strip of encased filler material, then sewing the tape transversely of the tie tape material and the bandage material by two spaced parallel rows of stitches, and at the same time severing the bandage material and the tie tapes between the line of stitches, then simultaneously placing a binder strip over each end of the bandage material and the ends of the tie tapes, thus providing a bandage having a tie tape secured at each end thereof having a pair of accordion folds in the tie tape between its secured ends.

WILLIAM D. YOUNG.